(12) United States Patent
Ogawa

(10) Patent No.: US 7,979,575 B2
(45) Date of Patent: Jul. 12, 2011

(54) ATTACK DETECTING SYSTEM AND ATTACK DETECTING METHOD

(75) Inventor: Jun Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1138 days.

(21) Appl. No.: 11/700,449

(22) Filed: Jan. 31, 2007

(65) Prior Publication Data

US 2008/0059596 A1    Mar. 6, 2008

(30) Foreign Application Priority Data

Sep. 6, 2006 (JP) .................................. 2006-241287

(51) Int. Cl.
*G06F 15/173* (2006.01)
*G06F 11/00* (2006.01)

(52) U.S. Cl. ........................... 709/238; 709/224; 726/22
(58) Field of Classification Search .................. 709/238, 709/207, 224–225, 219, 229; 726/22, 23
See application file for complete search history.

(56) References Cited

U.S. PATENT DOCUMENTS

| 6,725,378 B1* | 4/2004 | Schuba et al. .................. 726/13 |
| 2004/0250134 A1* | 12/2004 | Kohler et al. .................. 713/201 |
| 2005/0251859 A1* | 11/2005 | Quittek et al. .................. 726/22 |
| 2007/0140159 A1* | 6/2007 | Eronen et al. .................. 370/328 |

FOREIGN PATENT DOCUMENTS

JP    2005-293550    10/2005

* cited by examiner

*Primary Examiner* — Peling A Shaw
(74) *Attorney, Agent, or Firm* — Fujitsu Patent Center

(57) ABSTRACT

An IPS examines a communication packet exchanged between an internal communication network and an external communication network, and detects a particular packet that satisfies a particular condition. The IPS creates a detection request message which includes a request to detect the source of the particular packet and the destination of which is set to the address (virtual address) of the virtual server, and transmits the created message to an SLB, upon detection of the particular packet transmitted from the internal communication network. An RIP detecting device extracts a real address indicated as the destination in the detection request message upon receipt of the detection request message the destination of which is rewritten by the SLB from the virtual address to the real address of the server, which is the source of the particular packet.

18 Claims, 21 Drawing Sheets

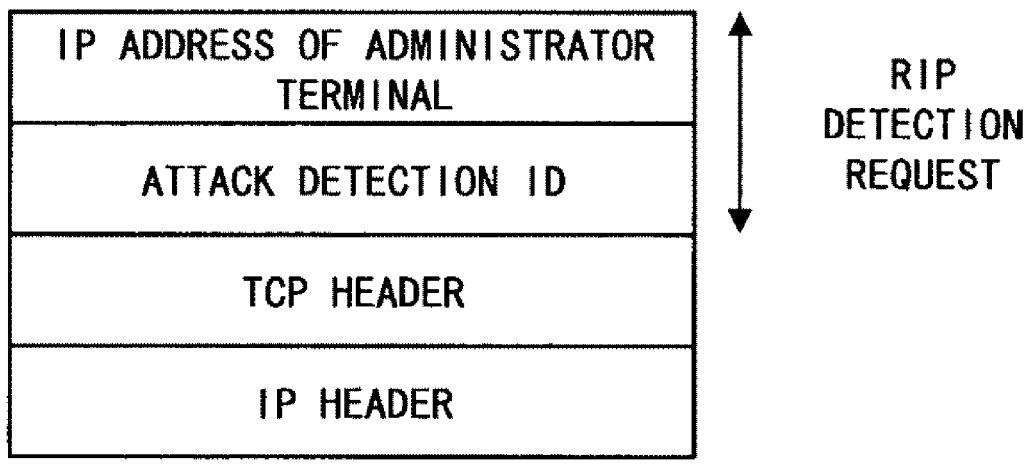
F I G. 6

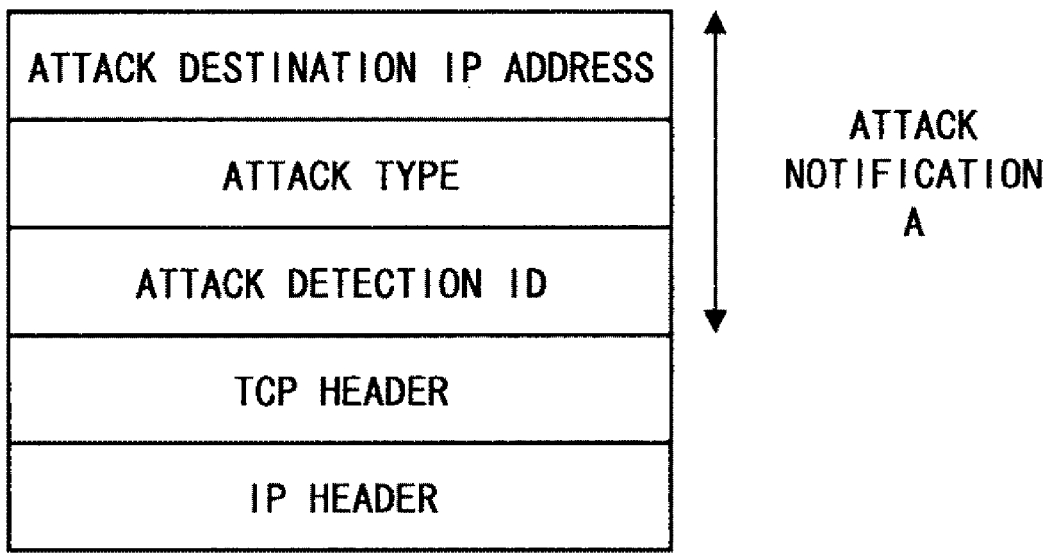
F I G. 7

| ITEM NUMBER | MESSAGE TYPE | SOURCE IP ADDRESS | DESTINATION IP ADDRESS |
|---|---|---|---|
| (1) | MESSAGE INCLUDING ATTACK FROM REAL SERVER (SUCH AS HTTP REPLY) | AA. BB. CC. D1 | FF. GG. HH. II |
| (2) | DITTO | WW. XX. YY. ZZ | FF. GG. HH. II |
| (4) | TCP RST WITHIN DATAGRAM: RIP DETECTION REQUEST | FF. GG. HH. II | WW. XX. YY. ZZ |
| (5) | ATTACK NOTIFICATION A | NN. OO. PP. QQ | JJ. KK. LL. MM |
| (6) | TCP RST WITHIN DATAGRAM: RIP DETECTION REQUEST | FF. GG. HH. II | AA. BB. CC. D1 |
| (8) | TCP RST | FF. GG. HH. II | AA. BB. CC. D1 |
| (9) | ATTACK NOTIFICATION B | AA. BB. CC. E1 | JJ. KK. LL. MM |

FIG. 14B

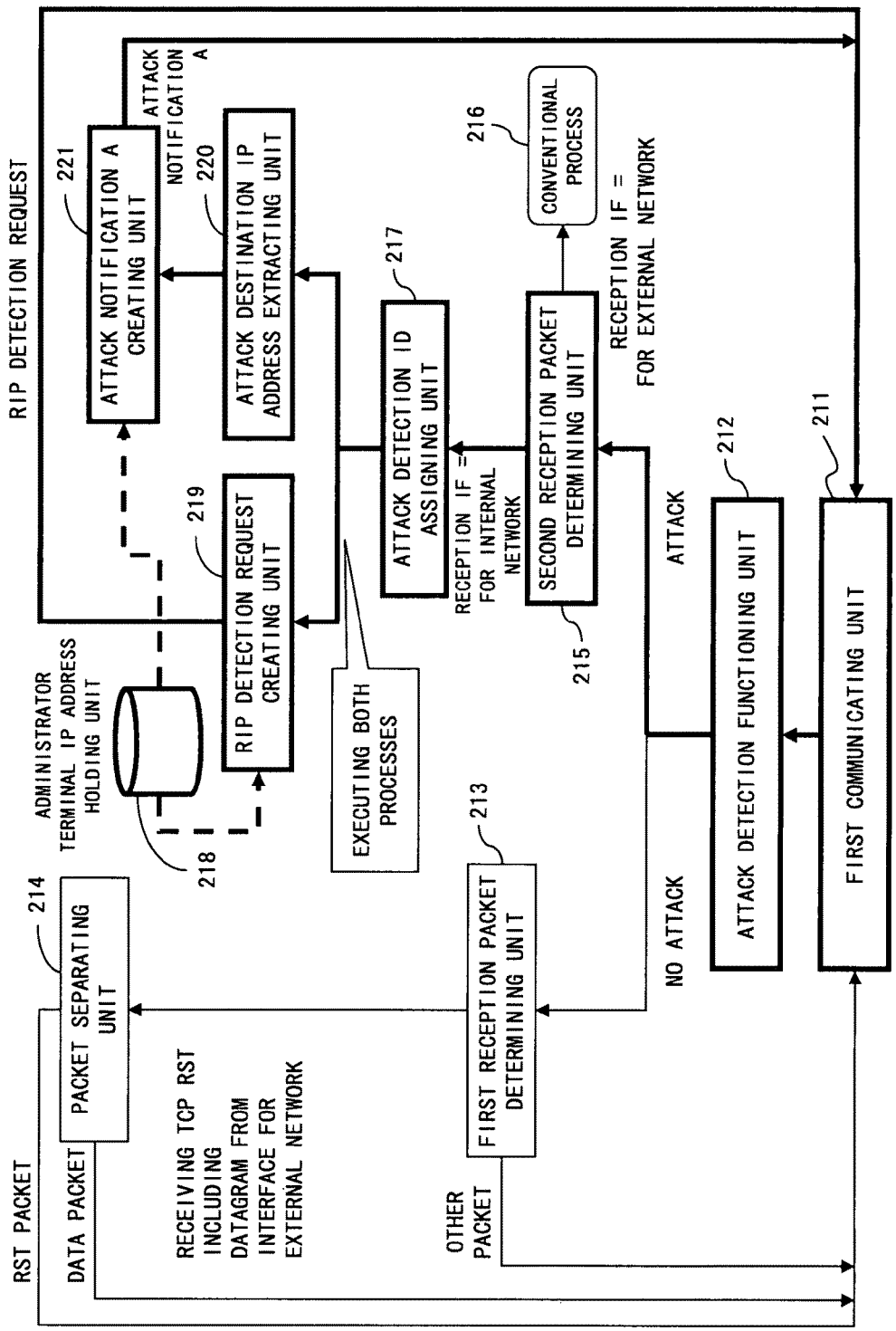
F I G. 15

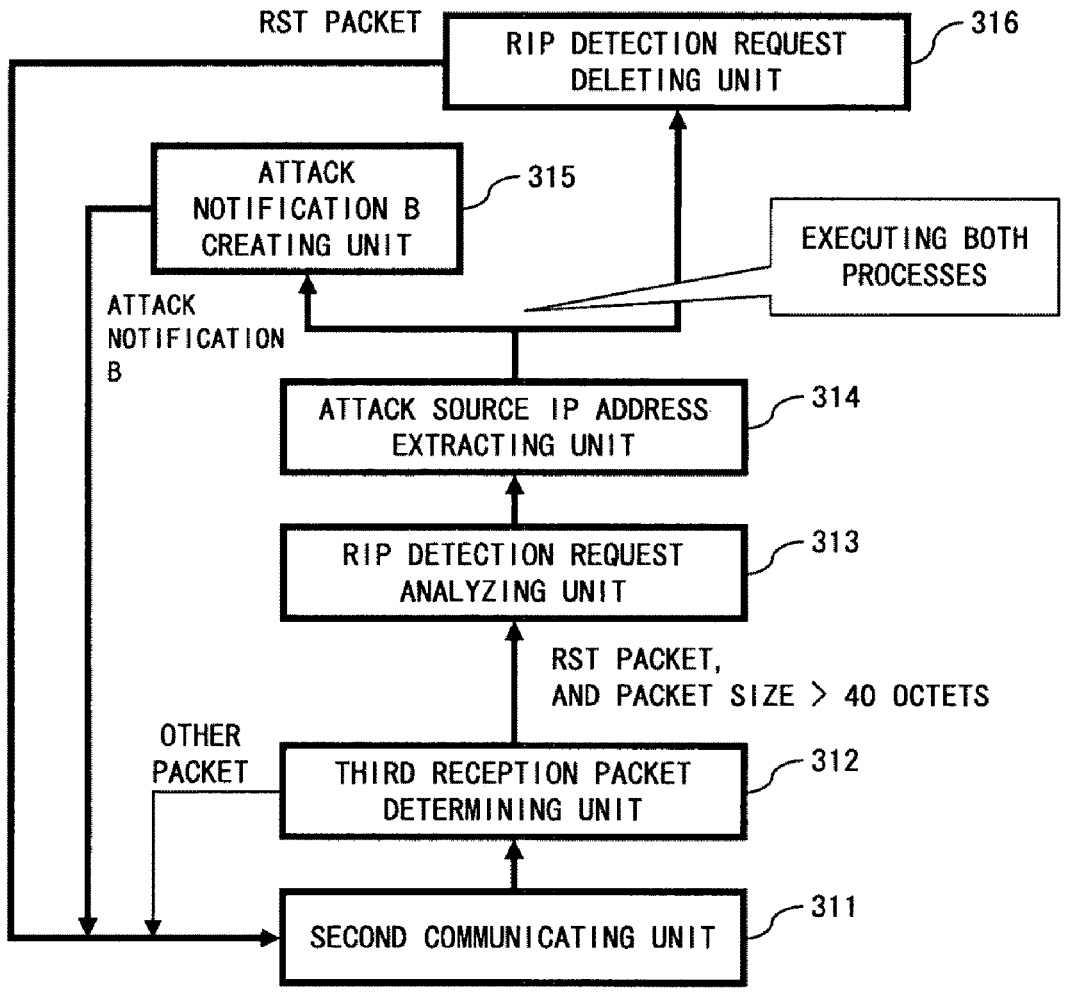
F I G. 16

| ITEM NUMBER | MESSAGE TYPE | SOURCE IP ADDRESS | DESTINATION IP ADDRESS |
|---|---|---|---|
| (1) | TCP RST (INCLUDING NORMAL DATA) | FF.GG.HH.11 | WW.XX.YY.ZZ |
| (3) | TCP (INCLUDING NORMAL DATA) | FF.GG.HH.11 | WW.XX.YY.ZZ |
| (4) | DITTO | FF.GG.HH.11 | AA.BB.CC.D2 |
| (6) | DITTO | FF.GG.HH.11 | AA.BB.CC.D2 |
| (7) | TCP RST | FF.GG.HH.11 | WW.XX.YY.ZZ |
| (8) | DITTO | FF.GG.HH.11 | AA.BB.CC.D2 |
| (10) | DITTO | FF.GG.HH.11 | AA.BB.CC.D2 |

FIG. 17B

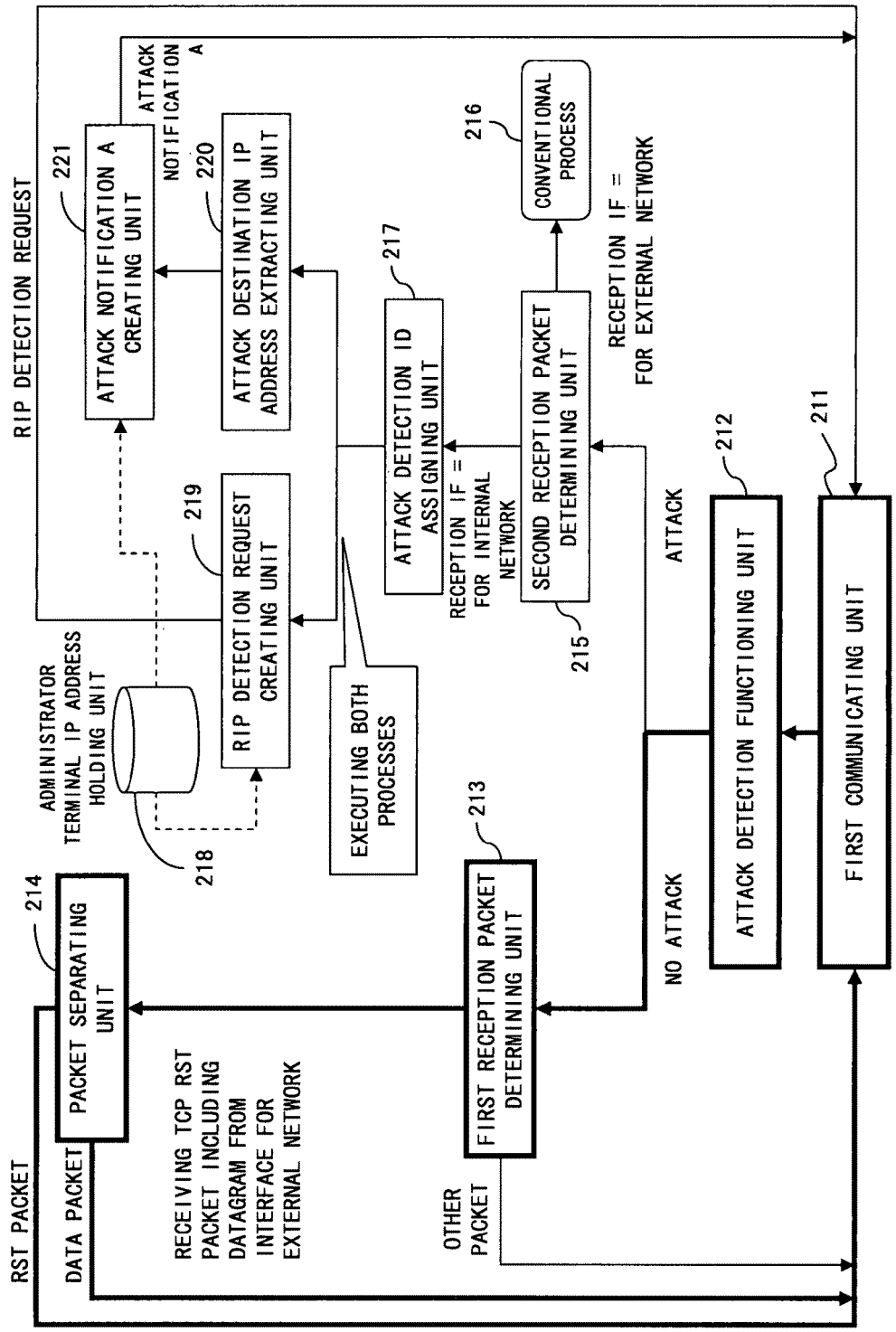
F I G. 18

ATTACK DETECTING SYSTEM AND ATTACK DETECTING METHOD

BACKGROUND OF THE INVENTION

1. Field of the Invention

The present invention relates to a technique for a data exchange communications network, and more particularly, to a technique for protecting a device, which is connected to a communications network, from an illegal access.

2. Description of the Related Art

An IPS (Intrusion Prevention System) is initially described.

A firewall exists as a representative device for protecting an IT system used by an organization. The firewall is installed in a point at which a communications network external to an organization (external network) and a communications network within the organization (internal network) are connected, and intended to protect the internal network from an illegal access by restricting a service (port) to permit a connection made from the external network. However, if a malicious code is buried in an access to the service to permit a connection, the firewall cannot detect this code. The IPS is a device having a function to protect the internal network by detecting such a malicious code.

The IPS targets all packets that flow on a communications network, detects and destroys an attack packet by analyzing data within the protocol header or the datagram of each packet, and notifies an administrator terminal that the attack is made. This data analysis is implemented with an examination, which is made to the header or the datagram of a packet by applying a pattern file distributed for each attack pattern. This pattern file is updated day by day in order to cope with the latest attack, and the latest search pattern is provided, for example, by using the Internet. Here, if an attack packet is detected, the IPS transmits an RST (Reset) packet of the TCP (Transfer Control Protocol) to an attack source (the source of the attack packet), which is made to forcibly disconnect a TCP connection. The protection of an internal network is made in this way.

Among IPSes, an IPS that particularly targets an attack to a Web application is referred to as WAF (Web Application Firewall). In this application, however, the WAF and a normal IPS are collectively referred to as an IPS without making a distinction between them.

An SLB (Server Load Balancer) is described next.

The SLB is a device for managing, in a centralized manner, connection requests from client terminals in an external network to a server provided in an internal network, and for transferring the requests to a plurality of servers, each of which has an equal function, in the internal network. For example, if accesses from users are too much in comparison with the processing capability of one Web server, the Web server becomes overloaded, and a response speed to a user becomes slow. The SLB distributively transmits the requests from users to the largest possible number of servers, whereby each server can be made to maintain an appropriate response speed. The SLB also has a function not to distribute a connection request to a server that is down. Accordingly, the SLB is used, thereby improving the fault-tolerance of a Web server.

FIG. 1 is described. A configuration of a communications network exemplified in this figure shows a configuration where a load distribution is made to 4 servers 301a, 301b, 301c, and 301d in an internal network 200. An SLB 201 is provided in this configuration, which leads to not only a 4-fold increase in performance but also an improvement in fault-tolerance, compared with the case where one server is operated.

Operations of the SLB 201 shown in FIG. 1 are described below.

Assume that a client terminal 101a among client terminals 101a, 101b, . . . , which exist in an external network 100, issues a request to http://www.a.com in FIG. 1. Also assume that the IP address of the client terminal 101a is 172.16.10.55.

A DNS (Domain Name Server) not shown initially makes name resolution to the request issued from the client terminal 101a. Here, assume that the IP address of the domain name www.a.com is proved to be 10.10.1.100 by the DNS. The client terminal 101a that has received this IP address issues a connection request to the server to which this IP address is assigned (here, a virtual server 300 in the internal network 200).

In the internal network 200, the virtual server 300 is configured with the SLB 201, and the servers 301a, 301b, 301c, 301d. Assume that IP addresses 192.168.20.1, 192.168.20.2, 192.168.20.3, and 192.168.20.4 are respectively assigned to the servers 301a, 301b, 301c, and 301d.

The connection request issued from the client terminal 101a is initially received by the SLB 201. Then, the SLB 201 selects a server, which is currently running, from among the 4 servers 301a, 301b, 301c, and 301d provided within the internal network 200 according to a predetermined load distribution algorithm such as a Round-robin, etc. Then, the SLB 201 distributes the connection request from the client terminal 101a to the selected server (referred to as a real server). At this time, the SLB 201 rewrites a destination IP address in the connection request issued from the client terminal 101a to the IP address of the real server. Accordingly, the client terminal 101a looks as if it communicates with the virtual server 300, without being conscious of the real server.

In the meantime, in a communication from the real server to the client terminal 101a, the SLB 201 performs procedures reverse to the above described ones to rewrite a source IP address in a response, which is issued by the real server to the connection request, from the IP address of the real server (this IP address is referred to as an "RIP (Real IP address)") to the IP address of the virtual server 300 (this IP address is referred to as "VIP (Virtual IP address)").

As described above, the SLB 201 provides the functions as one type of an address translating device.

Considered next is the protection of the internal network 200 from an illegal access made from the external network 100 by installing the above described IPS in the communications network the configuration of which is shown in FIG. 1. To implement this, an IPS 202 is normally installed at a boundary between the external network 100 and the internal network 200, namely, between the external network 100 and the SLB 201. Also a firewall is sometimes installed between the external network 100 and the IPS 202 in order to protect the internal network 200, although this is not shown in FIG. 2.

In FIG. 2, also an administrator terminal 203 is depicted along with the IPS 202. Upon detection of an attack packet, the IPS 202 notifies the administrator terminal 203 that the attack packet is detected, and notifies an administrator 204 of the internal network 200. In the configuration example shown in FIG. 2, two servers 301a and 301b are installed in the internal network 200.

As the technique for protecting an internal network from an attack made from an external network in this way, Japanese Published Unexamined Patent Application No. 2005-293550 discloses a technique for examining a data packet that passes through a firewall, and for installing a policy for protecting an internal network from a data packet to set information helpful to the analysis of the data packet if the data packet that represents an attack is detected in the examination.

Incidentally, the number of cases where an attack is made from a server in an internal network to a client terminal in an external network, such as a case where a malicious operator of an internal network embeds an attack code in a server, has been also increasing in recent years. Such a case is described with reference to FIG. 3.

The configuration of a communications network exemplified in FIG. 3 is the same as that shown in FIG. 2. Assume that a malicious operator embeds a code for attacking the client terminal 101a in either of the servers 301a and 301b in this configuration. At this time, a communication packet issued from the server 301a or 301b indicates either of IP addresses RIP1 (when the packet is issued from the server 301a) and RIP2 (when the packet is issued from the server 301b) as a source IP address.

However, in the configuration shown in FIG. 3, the SLB 201 is provided in the internal network 200. The SLB 201 executes an address translation process for rewriting the source IP address indicated in the packet to the IP address assigned to the virtual server 300, namely, VIP, even if the packet is issued from either the server 301a or 301b. Accordingly, if the IPS 202 detects a code for attacking the client terminal 101a from the communication packet transmitted from the SLB 201 ((1) in FIG. 3), and notifies the administrator terminal 203 of the source IP address indicated in the communication packet ((2) in FIG. 3), the notified source IP address is the VIP. Therefore, only with this notification, the administrator 204 cannot identify whether the code for attacking the client terminal 101a is embedded either in the server 301a or in 301b ((3) in FIG. 3). Additionally, since the attack source cannot be identified, also the client terminal 101a cannot be protected by transmitting the above described RST packet to the attack source, and by forcibly disconnecting a TCP connection.

Conventionally, to cope with such an attack from an internal network to an external network, an IPS 302 is installed also between the SLB 201 and the servers 301a and 301b separately from the IPS 202 as in the configuration of a communications network shown in FIG. 4. Namely, the IPS 202 detects and protects an attack made from the client terminal 101a, 101b, . . . in the external network 100 and notifies the administrator terminal 203, whereas the IPS 302 detects and protects an attack made from either of the servers 301a and 301b in the internal network 200 and notifies the administrator terminal 203. As a result, the source of the attack made from the internal network 200 to the external network 100 can be identified.

However, the two IPSes 202 and 302 are separately installed in this conventional configuration, leading to an increase in the system cost.

SUMMARY OF THE INVENTION

An object of the present invention is to inexpensively implement the detection of an attack from an internal communications network to an external communications network in a communications network.

An attack detecting system in one aspect of the present invention is an attack detecting system for detecting an attack to a terminal device, which exists in a communications network external to an organization, from any of a plurality of server devices, which exist in a communications network within the organization and to which a shared virtual address is assigned by an address translating device in addition to a real address unique to each of the plurality of server devices. This system comprises: a packet examining unit for examining a communication packet exchanged between the communications network within the organization and the communications network external to the organization, and for detecting a particular packet that satisfies a particular condition; a detection request message creating unit for creating a detection request message which includes a request to detect the source of the particular packet and the destination of which is set to the virtual address, and for transmitting the created message to the address translating device, when the packet examining unit detects the particular packet transmitted from the communications network within the organization; and a destination extracting unit for extracting a real address indicated as the destination in the detection request message, upon receipt of the detection request message the destination of which is rewritten by the address translating device from the virtual address to the real address of the server device, which is the source of the particular packet.

With this configuration, the destination extracting unit extracts the destination, which is rewritten by the address translating device, of the detection request message, whereby the real address of the server device, which is the source of the particular packet, can be obtained. Accordingly, the server device at the attack source (namely, the source of the particular packet) in the attack, which is made from the communications network within the organization to the communications network external to the organization, using the particular packet the source of which is set to the virtual address can be identified.

The above described attack detecting system according to the present invention can be also configured to further comprise a forcible disconnection message transmitting unit for transmitting a message to forcibly disconnect a connection used to transmit the particular packet to the server device identified with the real address extracted by the destination extracting unit.

With this configuration, the communication connection between the server device at the attack source and the attack destination in the attack using the particular packet can be forcibly disconnected.

Additionally, the above described attack detecting system according to the present invention can be also configured so that the detection request message creating unit creates, as the detection request message, an RST packet of the TCP protocol, which is intended to forcibly disconnect the connection used to transmit the particular packet and includes, as a datagram, information indicating a request to detect the source of the particular packet.

With this configuration, the server device at the attack source can be identified if an address translating device conforming to the TCP protocol is used.

Furthermore, this configuration can be also implemented to further comprise a forcible disconnection message transmitting unit for transmitting the RST packet, from which only the datagram is deleted, to the server device identified with the real address, when the destination extracting unit receives the RST packet the destination of which is rewritten by the address translating device from the virtual address to the real address of the server device, which is the source of the particular packet.

With this configuration, the communication connection between the server device at the attack source and the attack destination in the attack using the particular packet can be forcibly disconnected.

Still further, this configuration can be implemented to further comprise an RST packet separating unit for separating the RST packet of the TCP protocol, which is transmitted from a terminal device existing in the communications network external to the organization, into a TCP packet which includes only the datagram included in the RST packet as a datagram of the TCP packet itself and the source and the destination of which are made identical to the RST packet, and the RST packet from which only the datagram is deleted, and for transmitting the separated packets to the address translating device, when the packet examining unit detects the RST packet.

With this configuration, the server device can properly execute a process instructed by the RST packet transmitted from the terminal device existing in the communications network external to the organization, and identification between the RST packet and an RST packet, which is the detection request message, can be easily made.

Still further, this configuration can be also implemented so that the destination extracting unit comprises a detection request message determining unit for determining, based on the size of an RST packet, whether or not the RST packet received from the address translating device is the detection request message.

With this configuration, a malfunction, which is caused when the RST packet received from the address translating device is not the detection request message, can be prevented.

Still further, the above described attack detecting system according to the present invention can be also configured so that the packet examining unit comprises a particular packet information transmitting unit for transmitting particular packet information, which is information about the particular packet detected by the packet examining unit, to a predetermined administrator terminal device, and the destination extracting unit comprises a real address information transmitting unit for transmitting information about the real address extracted by the destination extracting unit to the administrator terminal device.

With this configuration, results of the detection, which is made by the attack detecting system, of an attack using a particular packet can be concentrated on the administrator terminal device, whereby an administrator can easily grasp the results of the detection.

Still further, this configuration can be also implemented so that the detection request message includes identification information for the particular packet information, and the real address information transmitting unit adds, to the information about the real address, the identification information included in the detection request message received from the address translating device, and transmits the information.

With this configuration, the administrator terminal device can easily make a correspondence between information about the particular packet and information about the real address for identifying the source of the particular packet.

Still further, this configuration can be also implemented so that the detection request message includes address information for identifying the administrator terminal device, and the real address information transmitting unit transmits the information about the real address by using, as a destination, the address information included in the detection request message received from the address translating device.

With this configuration, the need for providing the address information for identifying the administrator terminal device to the destination extracting unit beforehand is eliminated.

Also an attack detecting method used in the above described attack detecting system according to the present invention relates to the present invention.

According to the present invention, the detection of an attack from an internal communications network to an external communications network in a communications network can be inexpensively made as described above.

BRIEF DESCRIPTION OF THE DRAWINGS

The present invention will be more apparent from the following detailed description when the accompanying drawings are referenced.

FIG. 6 is a schematic showing the data structure of an IP packet including an RIP detection request;

FIG. 7 is a schematic showing the data structure of an IP packet including an attack notification A as a datagram;

FIG. 14B is a schematic showing the listing of the communication packets exchanged in the case of FIG. 14A;

FIG. 15 is a schematic explaining the details of processes executed by the IPS in the case of FIG. 14A;

FIG. 16 is a schematic explaining the details of processes executed by the RIP detecting device in the case of FIG. 14A;

FIG. 17B is a schematic showing the listing of the communication packets exchanged in the case of FIG. 17A;

FIG. 18 is a schematic explaining the details of processes executed by the IPS in the case of FIG. 17A.

DESCRIPTION OF THE PREFERRED EMBODIMENTS

A preferred embodiment according to the present invention is hereinafter described with reference to the drawings.

Figure 1:
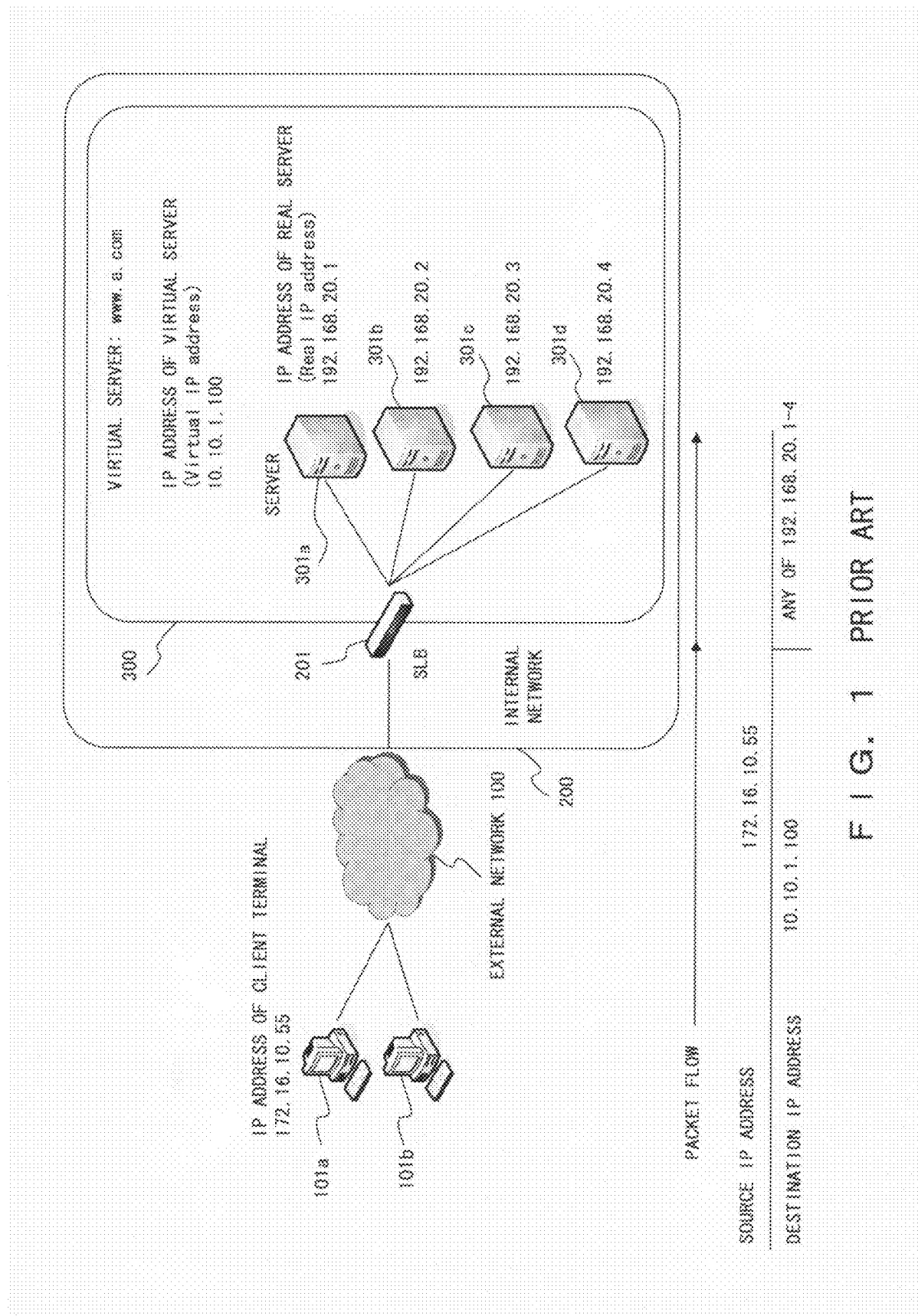
FIG. 1 is a schematic exemplifying a configuration of a communications network.
Figure 2:
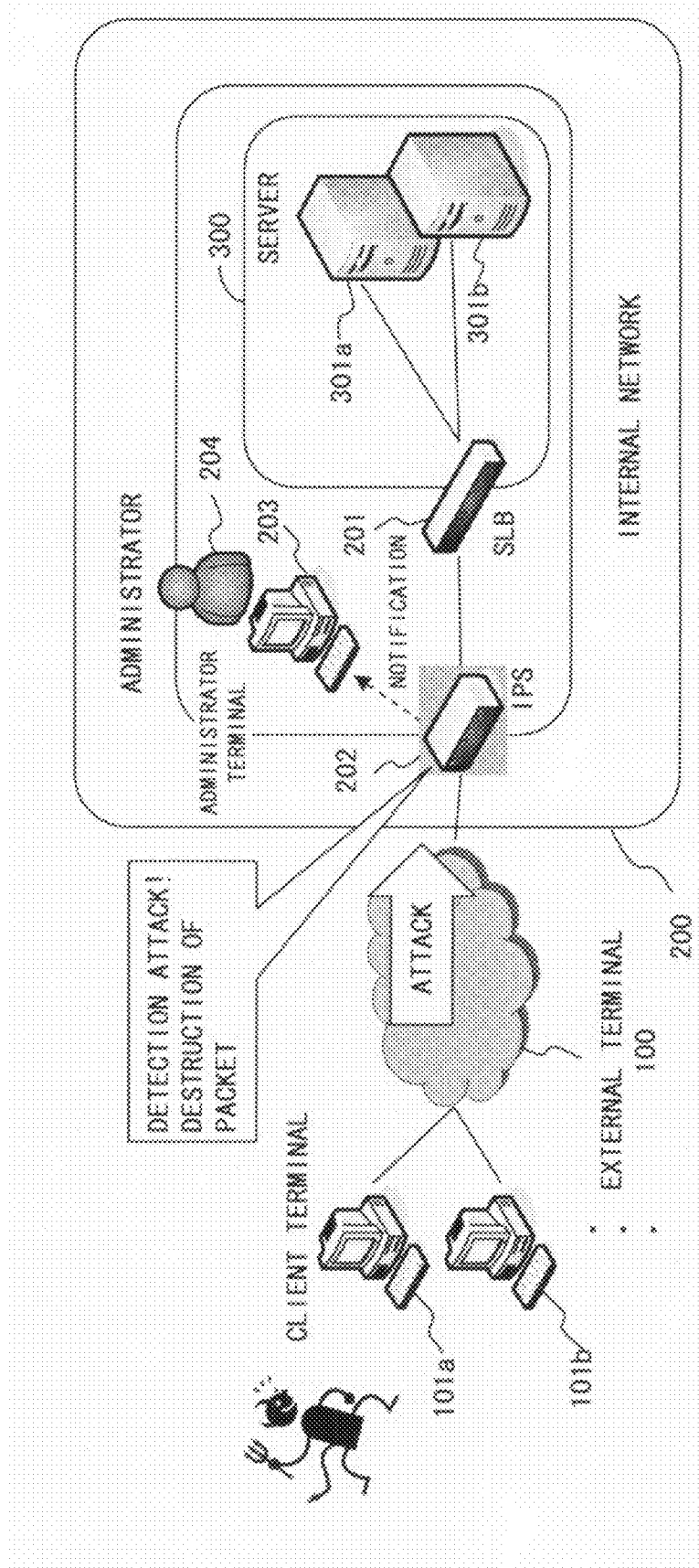
FIG. 2 is a schematic exemplifying an arrangement of an IPS in the communications network shown in FIG. 1.
Figure 3:
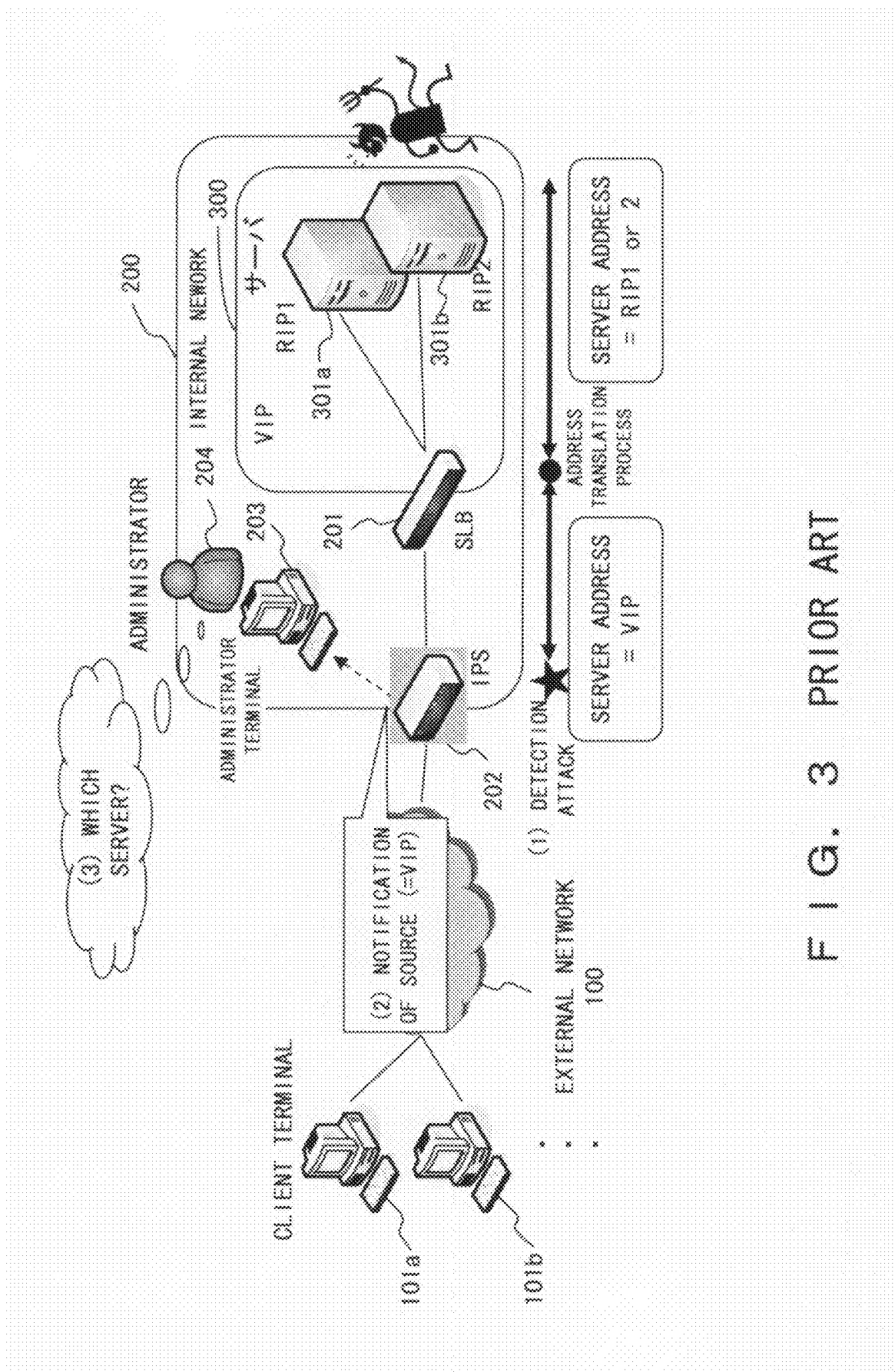
FIG. 3 is a schematic (No. 1) explaining problems of a conventional technique.
Figure 4:
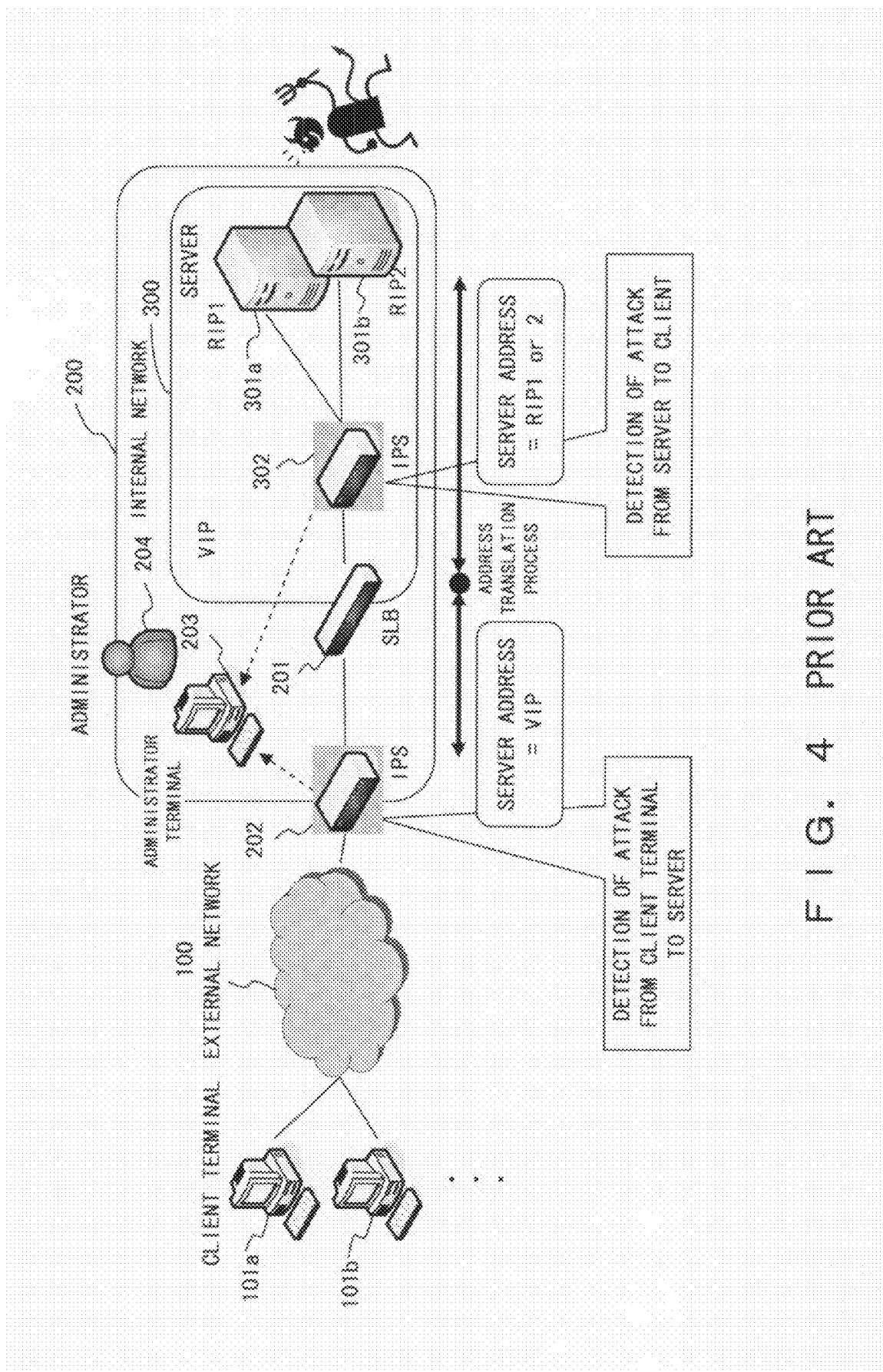
FIG. 4 is a schematic (No. 2) explaining a problem of a conventional technique.
Figure 5:
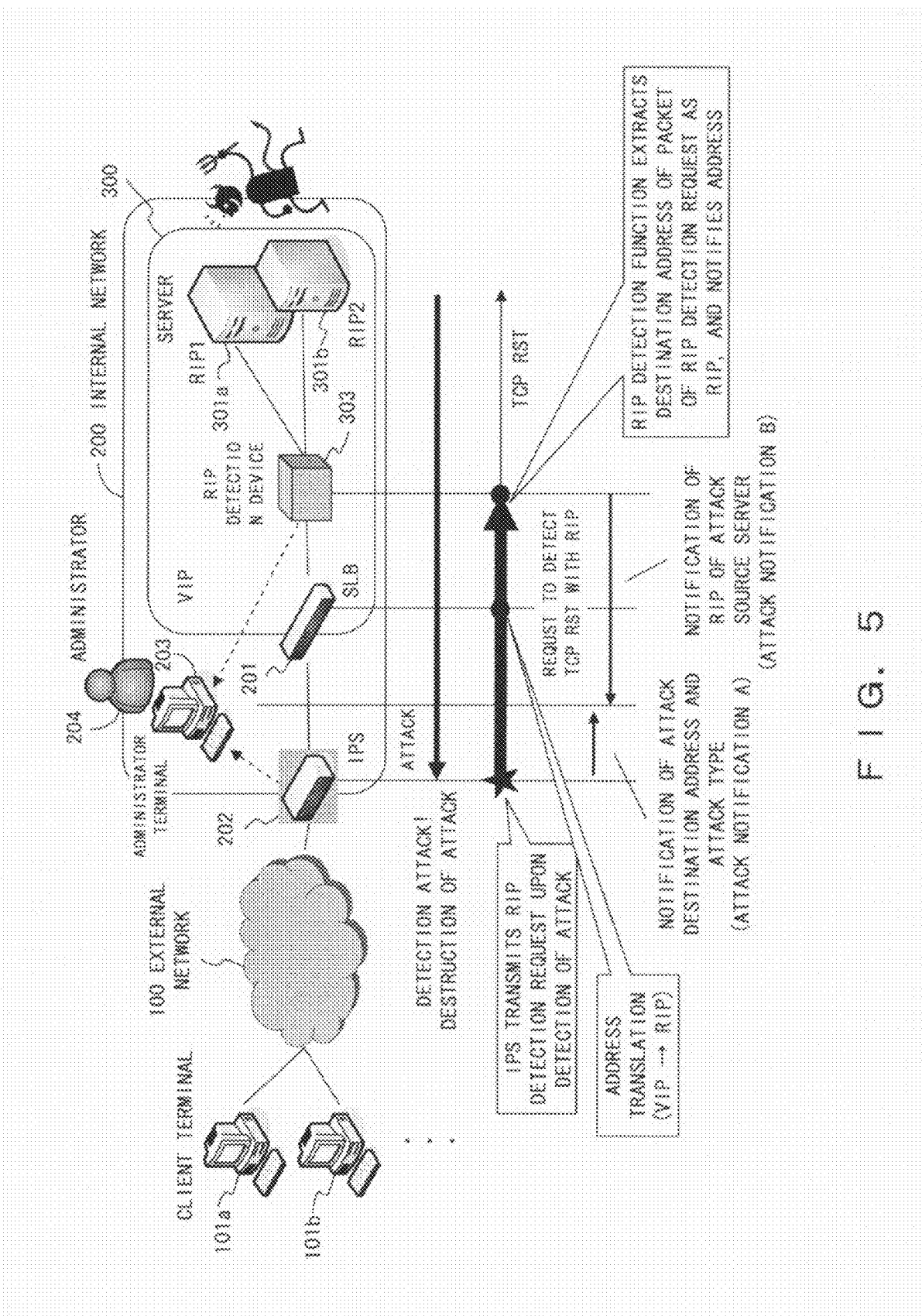
FIG. 5 is a schematic exemplifying a configuration of a communications network including an attack detecting system for implementing the present invention.

FIG. 5 is initially described. This figure shows a configuration example of a communications network including an attack detecting system for implementing the present invention. In the configuration shown in this figure, the present invention is implemented with an attack detecting system composed of an IPS 202 and an RIP detecting device 303. In this configuration, the RIP detecting device 303 is configured to be independent from other devices. Alternatively, the present invention can be also implemented by an attack detecting system composed of the IPS 202 and an SLB 201 by causing the SLB 201 to provide all of functions provided by the RIP detecting device 303. Additionally, in the preferred embodiment of the present invention, an administrator terminal 203 is used depending on need.

In the configuration shown in FIG. 5, an internal network 200, which is a communications network used within an organization, is connected to an external network 100 via the IPS 202. In the external network 100, which is a communications network external to the internal network 200, client terminals 101a, 101b, . . . exist.

In the internal network 200, a virtual server 300 for providing an access to the Web is configured with servers 301a and 301b, and the SLB 201, which is an address translating device, and the SLB 201 is connected to the IPS 202. Additionally, the RIP detecting device 303 is provided between the SLB 201 and the servers 301a and 301b. Here, IP addresses (real addresses) respectively assigned to the servers 301a and 301b are assumed to be RIP1 and RIP2, and an IP address (virtual address) assigned to the virtual server 30 is assumed to be VIP.

In FIG. 5, the virtual server 300 is configured with the two servers 301a and 301b. However, the present invention can be implemented also by configuring the virtual server 300 with a larger number of real servers.

The IPS 202 examines communication packets exchanged between the internal network 200 and the external network 100, and detects a packet (particular packet) that satisfies a particular condition. Here, if the above described attack packet is detected as a particular packet, the IPS 202 extracts and destroys the attack packet, and notifies the administrator terminal 203 that the attack has been made. Especially, upon detection of an attack packet from the virtual server 300 (namely, the server 301a or 301b) to the client terminal 101a, 101b, . . . of the external network 100, the IPS 202 creates an RST packet, the destination IP address of which is set to VIP (namely, the packet addressed to the virtual server 300) and which is made to include an RIP detection request as a datagram, and transmits the created packet to the SLB 201. The RST packet including the RIP detection request (this RST packet is also referred to as a "detection request message") is intended to request the RIP detecting device 303 to detect the source server of the attack packet detected by the IPS 202, and to forcibly disconnect the TCP connection corresponding to this attack packet. This RST packet is unique to the present invention. Furthermore, the IPS 202 transmits a communication packet (an attack notification A in FIG. 5), which includes the IP address (the destination IP address of the attack packet) of the attack destination proved with the analysis of the attack packet, and information (attack type) indicating the contents of the attack, to the administrator terminal 203.

In the meantime, the SLB 201 executes a conventional address reverse translation process for the RST packet that is issued by the IPS 202 and includes the RIP detection request, so that its destination IP address is rewritten from VIP to the real address (namely, either of RIP1 and RIP2) of a server that has issued the attack packet detected by the IPS 202 among the servers 301a and 301b. The rewritten RST packet including the RIP detection request is transmitted from the SLB 201 to the RIP detecting device 303.

Upon receipt of the RST packet including the RIP detection request from the SLB 201, the RIP detecting device 303 extracts the destination IP address indicated in this RST packet. Then, the RIP detecting device 303 transmits a communication packet (an attack notification B in FIG. 5) including the extracted destination IP address (namely, the real address of the server that has issued the attack packet among the servers 301a and 301b) to the administrator terminal 203.

The administrator terminal 203 makes a correspondence between the attack notification A notified from the IPS 202 and the attack notification B notified from the RIP detecting device 303, and outputs its result, for example, by causing a display device to display the result. The administrator 204 of the internal network 200 references this output, whereby he or she can identify the server, in which the code for attacking the client terminal 101a, 101b, . . . of the external network 100 is embedded, among the servers 301a, 301b.

In parallel with the above described operation, the RIP detecting device 303 deletes only the RIP detection request from the RST packet that is transmitted from the SLB 201 and includes the RIP detection request, and creates a conventional RST packet. Then, the RIP detecting device 303 transmits the created RST packet to the server identified with the previously extracted destination IP address, and the server is made to forcibly disconnect the TCP connection corresponding to the attack packet detected by the IPS 202. As a result, the attack destination (the client terminal 101a, 101b, . . . of the external network 100) is protected from the attack packet.

FIG. 6 is described next. This figure shows the data structure of the IP packet including the RIP detection request.

As shown in FIG. 6, this IP packet includes information about the RIP detection request as a datagram, and is configured by attaching known IP and TCP headers to this information. For example, the RST packet including the RIP detection request (detection request message), which is issued by the IPS 202, stores, in its IP header, the destination IP address (namely, the attack destination) of the attack packet as a source IP address, and the virtual address VIP as a destination IP address respectively, and an RST bit in a code bit field within the TCP header is set to 1.

As shown in FIG. 6, the RIP detection request has information fields of an "attack detection ID" and an "administrator terminal IP address". Here, in the field of the "attack detection ID", identification information, which is uniquely determined by the IPS 202 each time an attack packet is detected, is stored. This identification information is used to clarify the above described correspondence between the attack notifications A and B. Additionally, in the field of the "administrator terminal IP address", the IP address assigned to the administrator terminal 203 is stored. This is intended to eliminate the trouble of directly setting information about the destination of the attack notification B in the RIP detecting device 303 by notifying the IP address of the administrator terminal 203 from the IPS 202 to the RIP detecting device 303.

FIG. 7 is described next. This figure shows the data structure of an IP packet that includes the attack notification A as a datagram. The IPS 202 stores, in the IP header, the IP address of the IPS 202 itself as a source IP address, and the IP address of the administrator terminal 203 as a destination IP address respectively, and transmits this IP packet to the administrator terminal 203.

As shown in FIG. 7, the attack notification A has information fields of an "attack destination IP address", an "attack type", and an "attack detection ID". Here, in the field of the "attack destination IP address", the IP address (the destination IP address of the attack packet) of the attack destination (the client terminal 101a, 101b, . . . ), which is proved with the analysis of the attack packet made by the IPS 202, is stored. Additionally, in the field of the "attack type", information indicating the contents of the attack proved with the analysis of the attack packet made by the IPS 202 is stored. Furthermore, in the field of the "attack detection ID", the same identification information as that stored in the field of the "attack detection ID" in the above described RIP detection request is stored.

Figure 8:
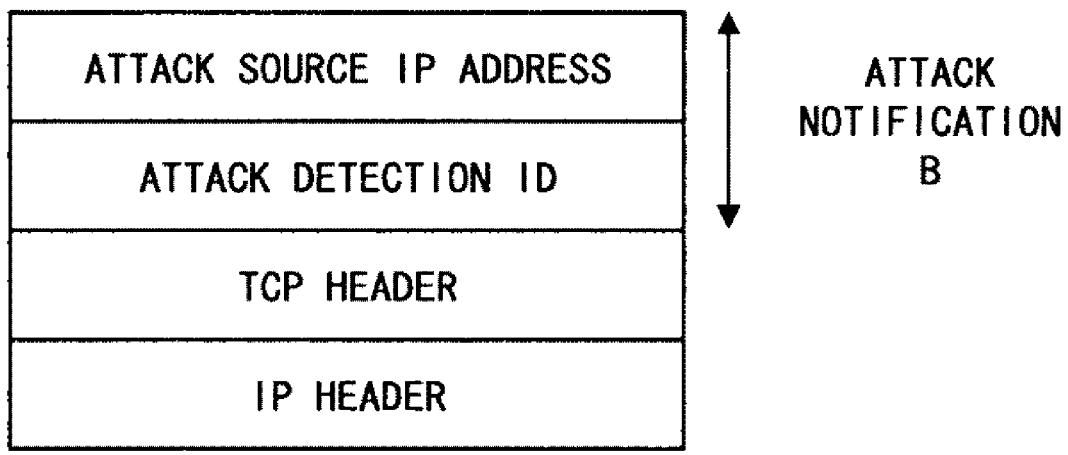
FIG. 8 is a schematic showing the data structure of an IP packet including an attack notification B as a datagram.

FIG. 8 is described next. This figure shows the data structure of an IP packet that includes the attack notification B as a datagram. The RIP detecting device 303 stores, in the IP header, the IP address of the RIP detecting device 303 itself as a source IP address, and the IP address of the administrator terminal 203 as a destination IP address respectively, and transmits this IP packet to the administrator terminal 203. Here, as the IP address of the administrator terminal 203, an address indicated as a datagram in the RST packet, which is issued from the IPS 202 and includes the RIP detection request, is used.

As shown in FIG. 8, the attack notification B has information fields of an "attack source IP address" and an "attack detection ID". Here, in the field of the "attack source IP address", an address stored as the destination IP address in the IP header of the RST packet, which includes the RIP detection request and for which the SLB 201 performs the address reverse translation, is stored. This IP address is the real address of the server device, which is the source of the attack packet. Additionally, in the field of the "attack detection ID", the same identification information as that stored in the field of the "attack detection ID" in the above described RIP detection request is stored.

Upon receipt of the attack notifications A and B, the administrator terminal 203 makes a comparison between the identification information of the attack detection IDs respectively stored in the notifications, makes a correspondence between the notifications the identification information of which match, and outputs the notifications. The administrator 204 of the internal network 200 references the outputs of the attack notifications A and B, between which the correspondence is made, whereby the administrator 204 can identify the server, in which the code for attacking the client terminal 101a, 101b, . . . of the external network 100 is embedded, among the servers 301a and 301b.

The identification function of the RIP detection request, which is implemented by the RIP detecting device, is described next with reference to FIGS. 9 and 10.

Figure 9:
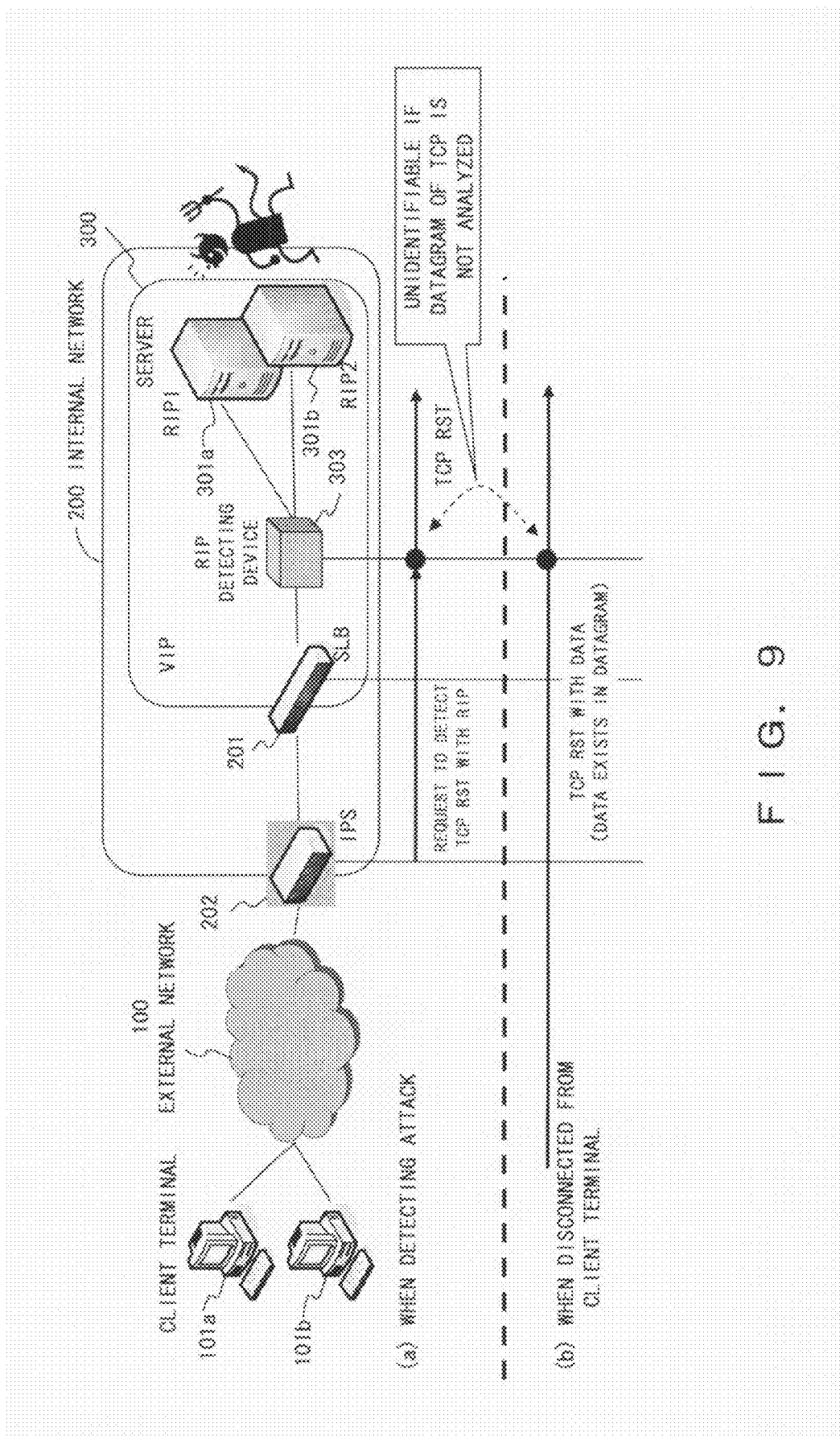
FIG. 9 is a schematic (No. 1) explaining an identification function of the RIP detection request.
Figure 10:
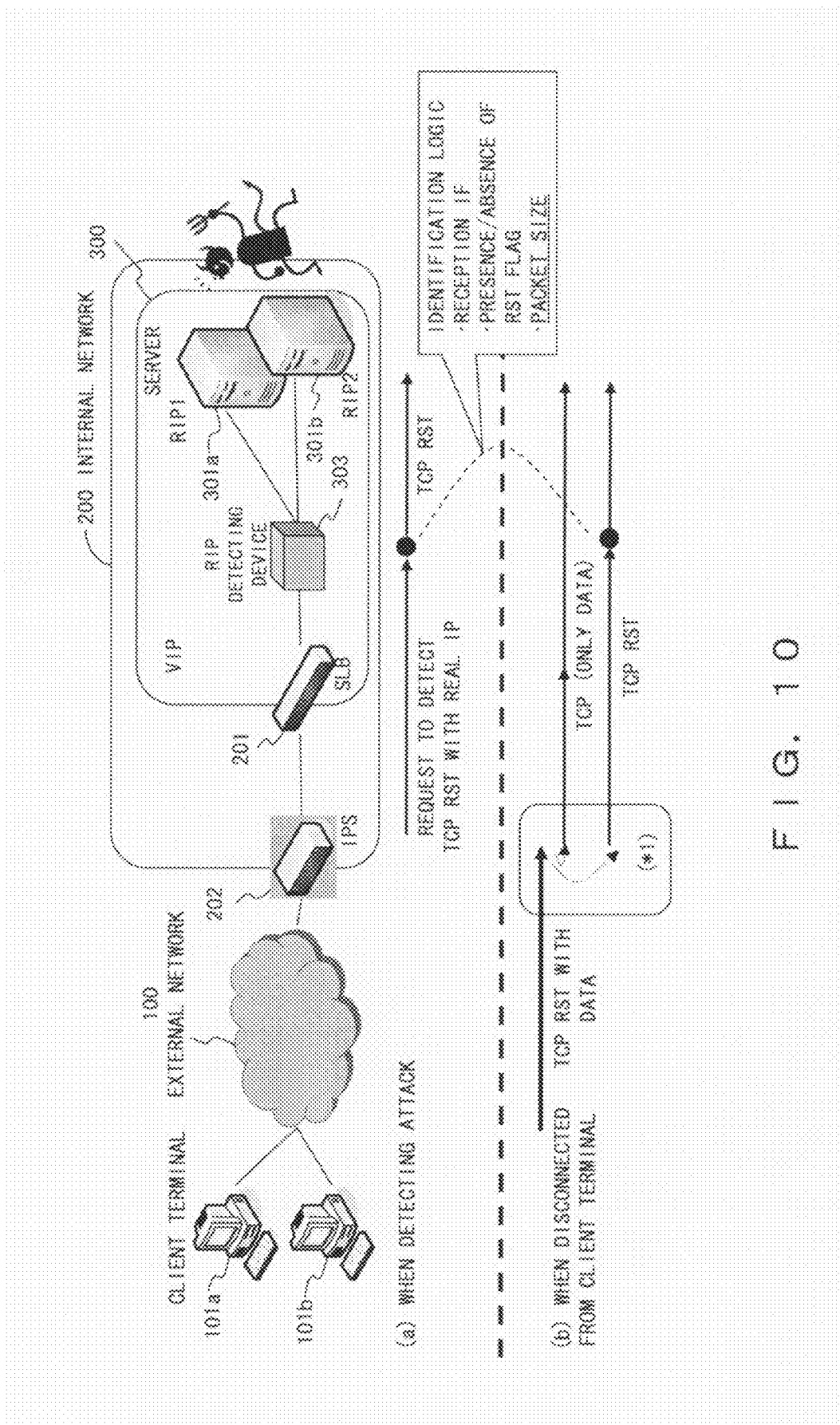
FIG. 10 is a schematic (No. 2) explaining the identification function of the RIP detection request.

Systems shown in FIGS. 9 and 10 have a configuration similar to that shown in FIG. 5, although the administrator terminal 203 is not shown.

As indicated as (a) in both of FIGS. 9 and 10, in the attack detecting system for implementing the present invention, an RST packet made to include an RIP detection request as a datagram is transmitted from the IPS 202 to the RIP detecting device 303, when the IPS 202 detects an attack packet transmitted from the internal network 200. Apart from this, also an RST packet that requests a disconnection of a TCP connection with the virtual server 300 can be sometimes transmitted from the client terminal 101a, 101b, . . . to the RIP detecting device 303 via the IPS 202 as indicated as (b) of FIG. 9.

Upon receipt of the RST packet shown in (b), the RIP detecting device 303 must properly transfer the RST packet to the destination server (the server 301a or 301b) of the RST packet without losing data included in the datagram, and must cause the server to disconnect the TCP connection. To implement this, the RIP detecting device 303 must identify whether or not the datagram of the RST packet transmitted from the IPS 202 includes the RIP detection request. To strictly analyze the datagram of the TCP packet, however, a capability equal to the IPS 202 is normally required. This can possibly lead to an increase in the system cost of the internal network 200.

Accordingly, to enable the RIP detecting device 303 to easily identify the above described RST packet, the IPS 202 executes a process for separating the RST packet transmitted from the client terminal 101a, 101b, . . . , into a TCP packet, which includes only the datagram of the RST packet as a datagram of the TCP packet itself and the source and the destination of which are made identical to the RST packet, and the RST packet from which only the datagram is deleted, as indicate by (b) of FIG. 10. Then, the IPS 202 transmits the TCP and the RST packets obtained with this process to the SLB 201.

The SLB 201 rewrites the destination IP addresses of the TCP and the RST packets to the real address of the server, which has issued the attack packet detected by the IPS 202, among the servers 301a and 301b by executing the conventional address reverse translation process for the packets, and transmits the rewritten packets to the RIP detecting device 303.

The RIP detecting device 303 identifies the packets received from the SLB 201. Here, since the datagram of the RST packet separated by the IPS 202 is empty, its size is definitely different from that of the RST packet including the RIP detection request. Accordingly, the RIP detecting device 303 classifies a received RST packet by its size. Namely, the IPS 202 separates the RST packet as described above, whereby the RIP detecting device 303 can easily identify whether or not the RST packet includes the RIP detection request without strictly analyzing the datagram.

Figure 11:
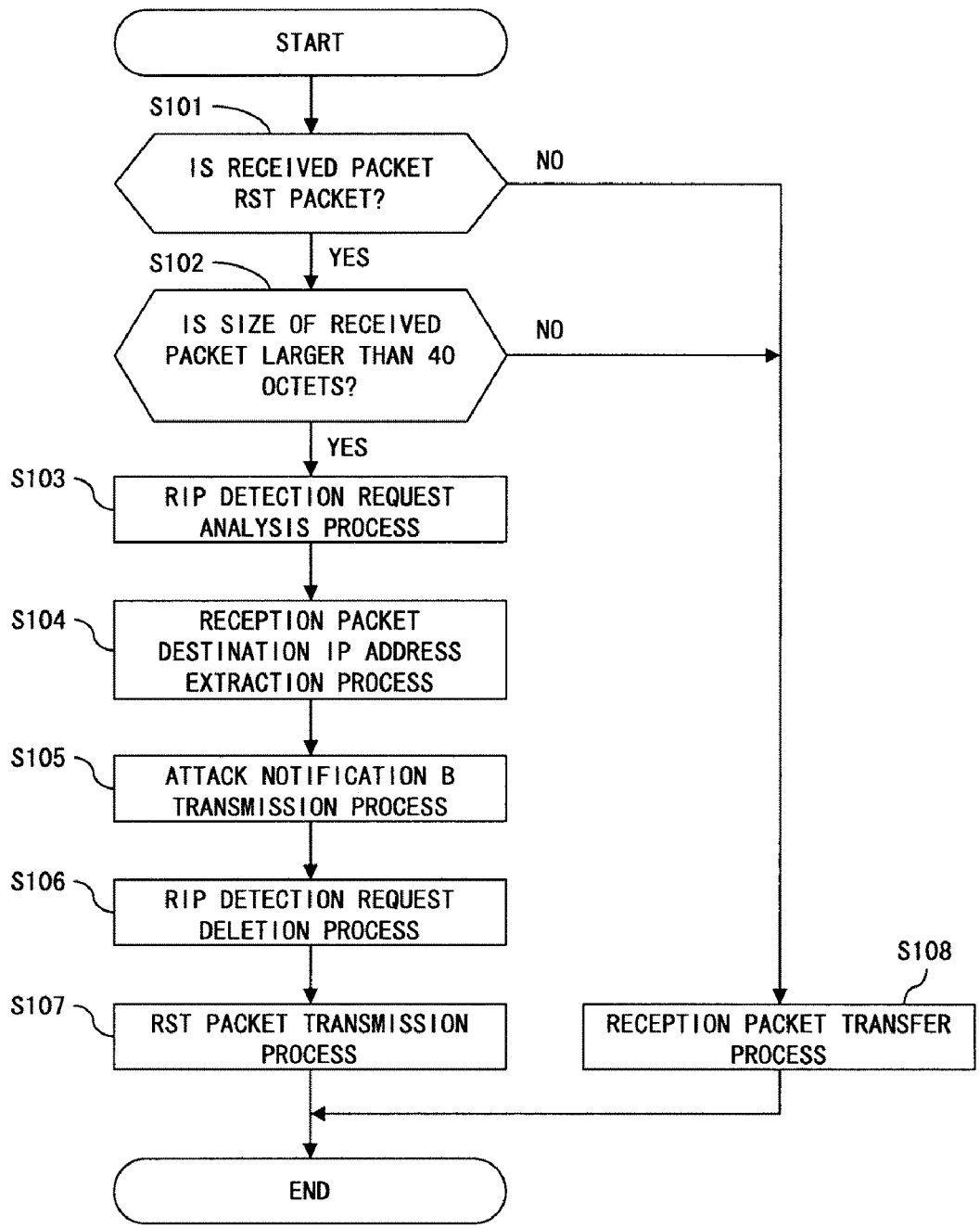
FIG. 11 is a flowchart showing an RIP detection process.

Here, FIG. 11 is described. This figure is a flowchart showing the RIP detection process executed by the RIP detecting device 303 shown in FIG. 5.

The process shown in FIG. 11 is started each time the RIP detecting device 303 receives a communication packet transmitted from the SLB 201 via a dedicated communications interface.

In FIG. 11, firstly, in S101, a process for determining whether or not a received packet is an RST packet is executed. Specifically, this determination is made by judging whether or not the RST bit in the code bit field within the TCP header of the received packet is set to 1. Here, if the received packet is determined to be an RST packet (a determination result is YES), the process proceeds to S102. Or, if the received packet is determined not to be an RST packet (the determination result is NO), the process proceeds to S108.

In S102, a process for determining whether or not the size of the received RST packet is larger than 40 octets is executed.

For a known TCP packet, the lengths of IP and TCP headers are respectively 20 octets. Accordingly, a TCP packet the size of which is larger than 40 octets, which is the sum of the lengths of both of the headers, includes some data as a datagram. However, the IPS 202 in the attack detecting system shown in FIG. 5 executes the above described RST packet separation process for an RST packet transmitted from the client terminal 101a, 101b, . . . . Therefore, the RST packet the size of which is determined to be larger than 40 octets is only an RST packet including an RIP detection request. Namely, the process of S102 is a process for determining whether or not the RST packet received from the SLB 201 is a detection request message based on the size of the RST packet, that is, a detection request message determination process.

If the size of the received RST packet is larger than 40 octets in the determination process in S102 (a determination result is YES), the process proceeds to S103 by determining that the detection request message is received. Or, if the size of the received RST packet is equal to or smaller than 40 octets in this determination process (the determination result is NO), the process proceeds to S108 by determining that the RST packet which does not include the RIP detection request is received.

In S103, an RIP detection request analysis process, namely, a process for analyzing the received detection request message based on the data structure shown in FIG. 6, and for obtaining the attack detection ID and the IP address of the administrator terminal 203 is executed.

In S104, a received packet destination IP address extraction process, namely, a process for analyzing the IP header in the received detection request message, and for extracting the destination IP address of this message is executed. The IP address extracted with this process is the attack source IP address, namely, the real IP address of the source server of the attack packet.

In S105, an attack notification B transmission process is executed. Namely, a process for storing, as a datagram, the attack notification B composed of the attack detection ID obtained with the process of S103, and the attack source IP address extracted with the process of S104 according to the data structure shown in FIG. 8, and for transmitting, to the administrator terminal 203, a communication packet the IP header of which is configured by setting the IP address of the administrator terminal 203, which is obtained with the process of S103, as a destination IP address, and the IP address assigned to the RIP detecting device 303 itself as a source IP address is executed.

In S106, an RIP detection request deletion process, namely, a process for creating a conventional RST packet by deleting only the RIP detection request from the detection request message transmitted from the SLB 201 is executed. Then, in S107, a process for transmitting the RST packet, from which the RIP detection request is deleted, to the server, which is the destination of the packet, among the servers 301a and 301b, is executed. Thereafter, the process of FIG. 11 is terminated.

In the meantime, if the determination result of S101 or S102 is NO, a reception packet transfer process is executed in S108. Namely, a process for transferring, to the destination server, a received packet of which the determination result in S101 is NO, that is, the received packet which is not an RST packet, and a received packet of which the determination result of S102 is NO, that is, the received packet which is not the detection request message is executed. Thereafter, the process of FIG. 11 is terminated.

Figure 12:
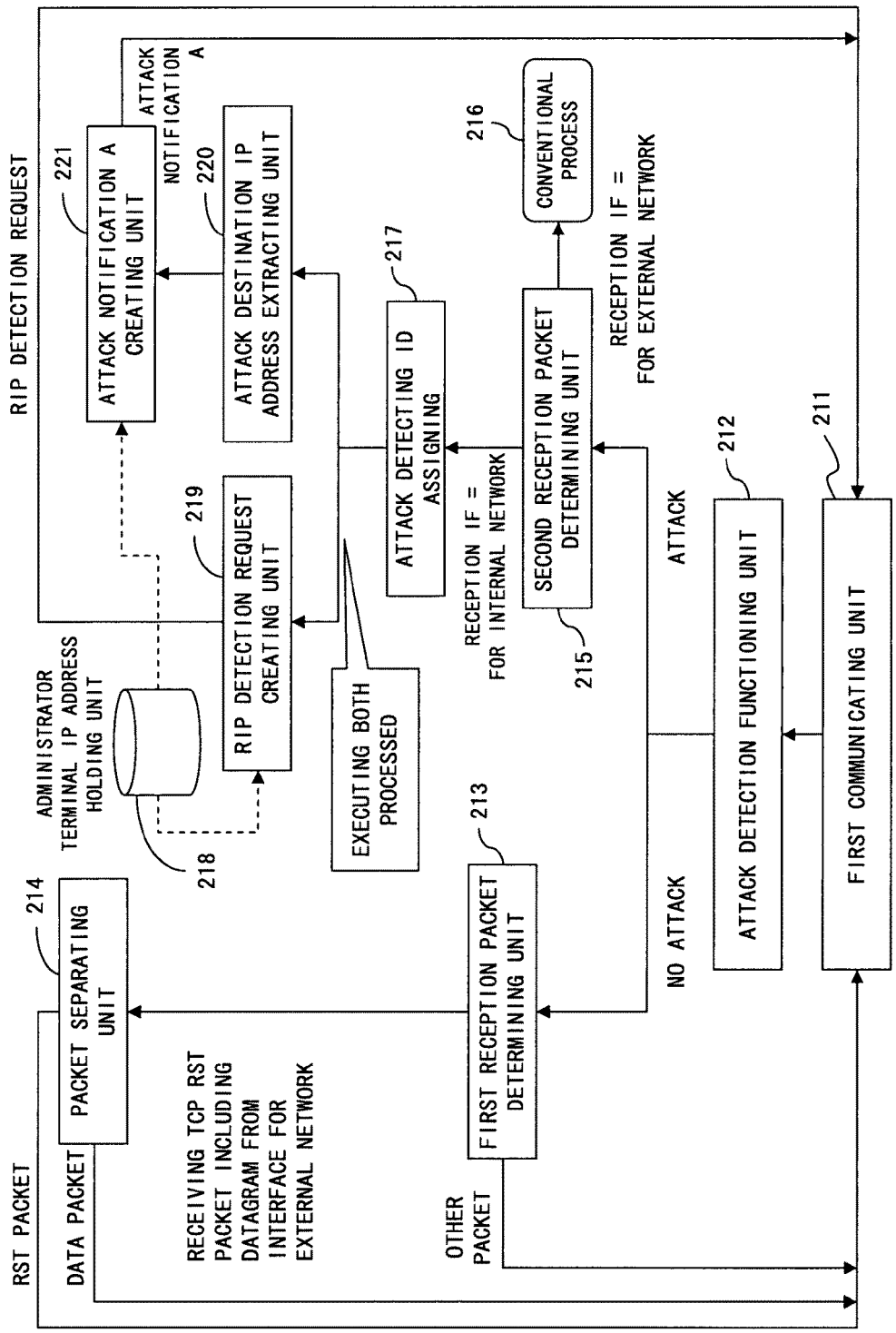
FIG. 12 is a block diagram showing the functional configuration of the IPS shown in FIG. 5.
Figure 13:
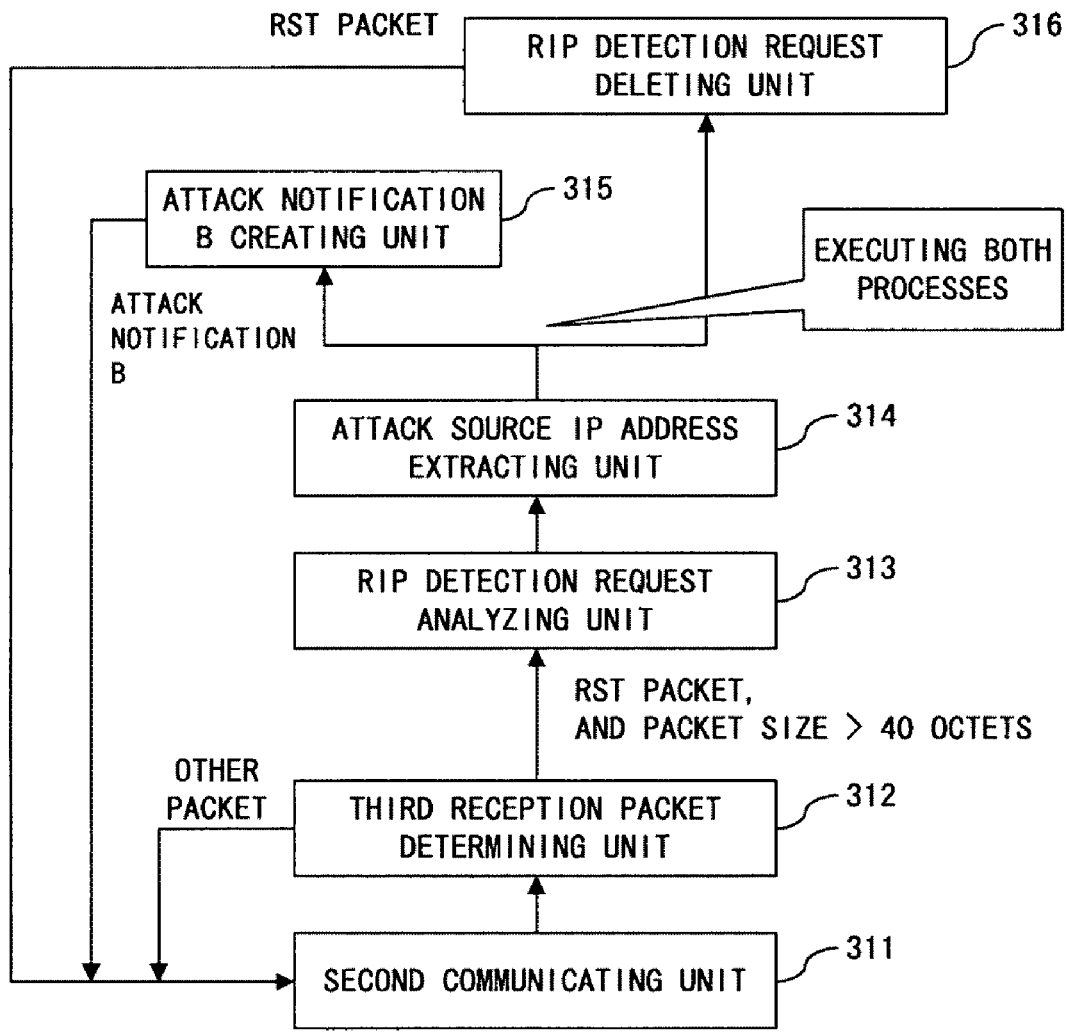
FIG. 13 is a block diagram showing the functional configuration of an RIP detecting device shown in FIG. 5.

FIGS. 12 and 13 are described next. FIG. 12 is a block diagram showing the functional configuration of the IPS 202, whereas FIG. 13 is a block diagram showing the functional configuration of the RIP detecting device 303.

The functional configuration of the IPS 202 shown in FIG. 12 is initially described.

A first communicating unit 211 comprises a communications interface for the external network 100, and a communications interface for the internal network 200, and executes a process for transmitting/receiving a communication packet to/from both the external network 100 and the internal network 200.

An attack detection functioning unit 212 examines a communication packet received from the internal network 200 or the external network 100, and detects a packet (particular packet) that satisfies a particular condition. Here, if an attack packet including a malicious code in a datagram is detected as a particular packet by applying the above described pattern file, etc., the attack detection functioning unit 212 determines the attack type of the attack packet. Then, the attack detection functioning unit 212 transmits a determination result to an attack notification A creating unit 221, and activates a second reception packet determining unit 215. Or, if the received packet is determined not to be an attack packet, the attack detection functioning unit 212 transmits the determination result to a first reception packet determining unit 213.

The first reception packet determining unit 213 determines whether or not the received packet is an RST packet, which includes a datagram and is received from the communications interface on the side of the external network 100, and transmits a received packet that satisfies this condition to a packet separating unit 214. Or, the first reception packet determining unit 213 transmits a received packet that does not satisfy the condition to the first communicating unit 211, which is then made to transmit the packet to the internal network 200 unchanged.

The packet separating unit 214 separates the RST packet received from the first reception packet determining unit 213 into a TCP packet (referred to as a data packet), which includes only the datagram of the RST packet as a datagram of the TCP packet itself and the source and the destination of which are made identical to the RST packet, and the RST packet from which only the datagram is deleted. Then, the packet separating unit 214 transmits the obtained data packet and RST packet to the first communicating unit 211, which is then made to transmit the packets to the internal network 200. At this time, the data packet is transmitted prior to the RST packet.

The second reception packet determining unit 215 determines whether the communications interface which has received the attack packet is either for the internal network 200 or for the external network 100. Here, if the attack packet is determined to be received from the communications interface for the internal network 200, the second reception packet determining unit 215 activates an attack detection ID assigning unit 217. Or, if the attack packet is determined to be received from the communications interface for the external network 100, a conventional process 216, namely, the process executed conventionally by the IPS 202 to protect the internal network 200 from an attack made from the external network 100 is executed.

The attack detection ID assigning unit 217 assigns the above described attack detection ID, which is the identification information for clarifying the correspondence between the attack notifications A and B, each time an attack packet from the internal network 200 is detected, and activates an RIP detection request creating unit 219 and an attack destination IP address extracting unit 220. Here, the attack detection ID assigning unit 217 is assumed to generate and assign a number unique to each attack packet as an attack detection ID. The assigned attack detection ID is transmitted to the RIP detection request creating unit 219 and the attack notification A creating unit 221. Then, the attack detection IP assigning unit 217 activates the RIP detection request creating unit 219 and the attack destination IP address extracting unit 220.

An administrator terminal IP address holding unit 218 is a memory of a semiconductor, etc. In the administrator terminal IP address holding unit 218, the IP address of the administrator terminal 203 is prestored and held.

The RIP detection request creating unit 219 creates an RIP detection request with the IP address of the administrator terminal 203, which is obtained from the administrator terminal IP address holding unit 218, and the attack detection ID assigned by the attack detection ID assigning unit 217. Then, the RIP detection request creating unit 219 creates an IP packet including the RIP detection request, the data structure of which is shown in FIG. 6. In the IP header of this IP packet, a source IP address is set to the IP address of the destination (namely, the attack destination) of the detected attack packet, and a destination IP address is set to the virtual address VIP.

Furthermore, the RIP detection request creating unit 219 sets to 1 the RST bit in the code bit field within the TCP header of the created IP packet, and creates a detection request message. Then, the RIP detection request creating unit 219 transmits the created detection request message to the first communicating unit 211, which is then made to transmit the message to the internal network 200. After the transmitted detection request message is received by the SLB 201 and the reverse translation process for the destination IP address is executed, the message is received by the RIP detecting device 303.

The attack destination IP address extracting unit 220 extracts the destination IP address of the detected attack packet as the IP address of the attack destination. Then, the attack destination IP address extracting unit 220 transmits the extracted IP address to the attack notification A creating unit 221.

The attack notification A creating unit 221 creates an attack notification A with the attack detection ID assigned by the attack detection ID assigning unit 217, the attack type of the attack packet, which is determined by the attack detection functioning unit 212, and the attack destination IP address extracted by the attack destination IP address extracting unit 220. Then, the attack notification A creating unit 221 creates an IP packet that includes the attack notification A as a datagram and is shown in FIG. 7. In the IP header of this IP packet, the IP address of the IPS 202 itself is set as a source IP address, and the IP address of the administrator terminal 203, which is obtained from the administrator terminal IP address holding unit 218, is set as a destination IP address. Then, the attack notification A creating unit 221 transmits the created IP packet to the first communicating unit 211, which is then made to transmit the packet to the internal network 200. Thereafter, the transmitted IP packet is received by the administrator terminal 203.

The functional configuration of the RIP detecting device 303 shown in FIG. 13 is described next.

A second communicating unit 311 comprises a communications interface for the internal network 200, and executes a process for transmitting/receiving a communication packet to/from the internal network 200.

A third reception packet determining unit 312 executes the processes in S101 and S102 of FIG. 11, and determines whether or not a communication packet received from the SLB 201 is an RST packet, and whether or not its size is larger than 40 octets. If the received packet satisfies these conditions, the third reception packet determining unit 312 transmits this received packet to an RIP detection request analyzing unit 313. Or, if the received packet does not satisfy the conditions, the third reception packet determining unit 312 transmits the received packet to the second communicating unit 311, which is then made to transmit the packet to the server 301*a* or 301*b* unchanged.

The RIP detection request analyzing unit 313 executes the process of S103 shown in FIG. 11, extracts data of the fields of the RIP detection request included in the received packet, and thereafter activates an attack source IP address extracting unit 314. The data extracted here is transmitted to an attack notification B creating unit 315 and an RIP detection request deleting unit 316.

The attack source IP address extracting unit 314 extracts the destination IP address of the received packet as an attack source IP address, transmits the extracted address to the attack notification B creating unit 315, and activates the RIP detection request deleting unit 316.

The attack notification B creating unit 315 creates an attack notification B with the attack detection ID extracted by the RIP detection request analyzing unit 313, and the attack source IP address extracted by the attack source IP address extracting unit 314. Then, the attack notification B creating unit 315 creates an IP packet that includes the attack notification B as a datagram and is shown in FIG. 8. In the IP header of this IP packet, the IP address of the RIP detecting device 303 itself is set as a source IP address, and the IP address of the administrator terminal 302, which is extracted by the RIP detection request analyzing unit 313, is set as a destination IP address. Then, the attack notification B creating unit 315 transmits the created IP packet to the second communicating unit 311, which is then made to transmit the packet to the internal network 200. The transmitted IP packet is thereafter received by the administrator terminal 203.

The RIP detection request deleting unit 316 deletes an RIP detection request included in a received packet as a datagram. Then, the RIP detection request deleting unit 316 transmits the generated RST packet to the second communicating unit 311, which is then made to transmit the RST packet to the server at the attack source, which has transmitted the attack packet.

Operations of the attack detecting system in the communications network shown in FIG. 5 are respectively described below by assuming a case where the server 301*a* of the internal network 200 transmits an attack packet addressed to the client terminal 101*a* of the external network 100, and a case where the client terminal 101*a* of the external network 100 transmits an RST packet addressed to the virtual server 300 of the internal network 200.

Figure 14A:
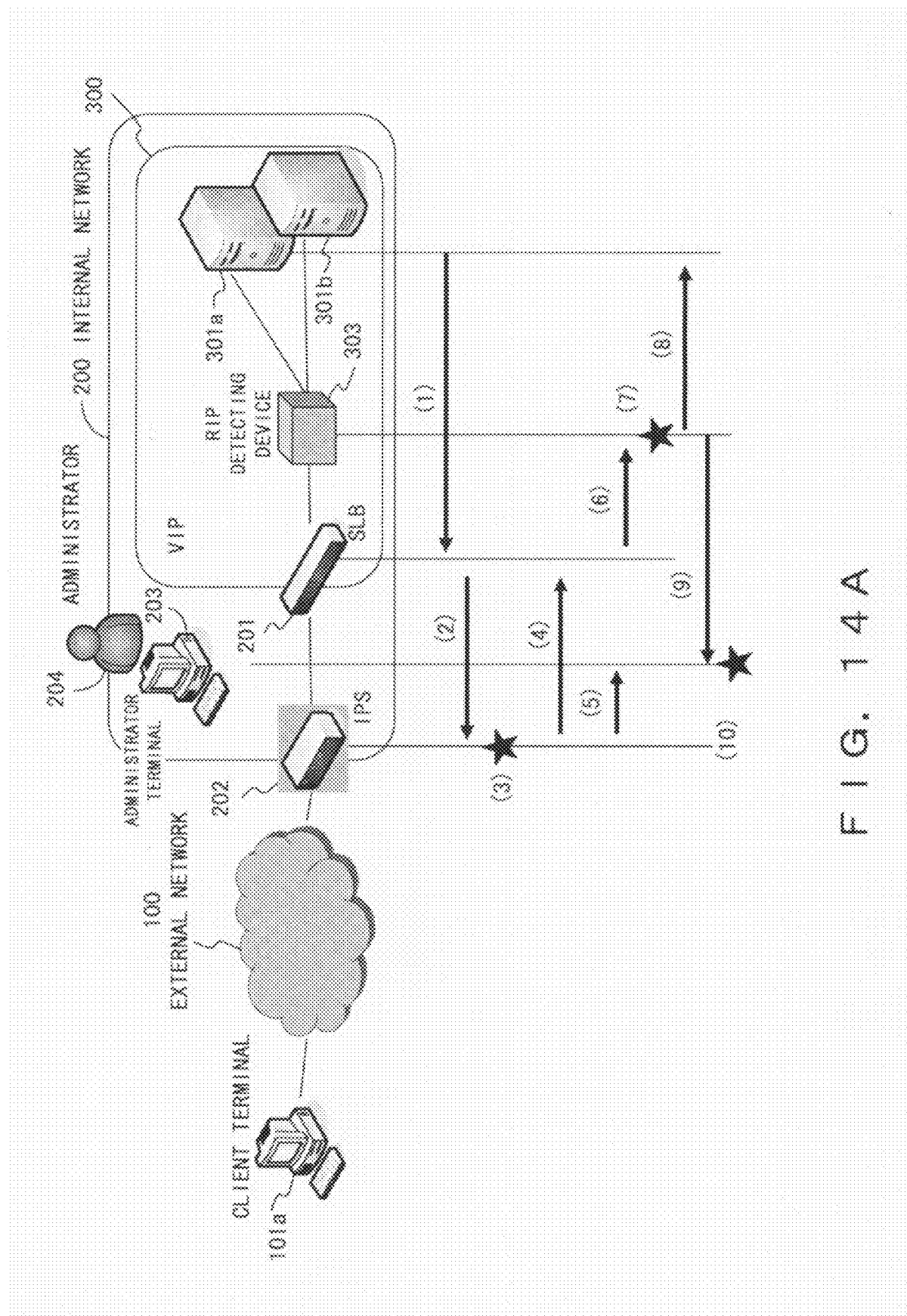
FIG. 14A is a schematic showing a state where various types of communication packets are exchanged when a server 301a shown in FIG. 5 transmits an attack packet.

FIGS. 14A and 14B are described first. FIG. 14A shows a state where various types of communication packets are exchanged when the server 301*a* transmits an attack packet, whereas FIG. 14B shows the listing of the communication packets exchanged in the case of FIG. 14A. In FIG. 14A, only the client terminal 101*a* is depicted as a terminal existing in the external network 100 for the sake of simplification.

Assume that the IP addresses of the devices existing in the communications networks shown in FIG. 14A are defined as follows.

the real address of the server 301*a*: AA.BB.CC.D1
the real address of the server 301*b*: AA.BB.CC.D2
the virtual address of the virtual server 300: WW.XX.YY.ZZ
the address of the RIP detecting device 303: AA.BB.CC.E1
the address of the client terminal 101*a*: FF.GG.HH.II
the address of the administrator terminal 203: JJ.KK.LL.MM
the address of the IPS 202: NN.OO.PP.QQ The state where the communication packets are exchanged is described below with reference to item numbers denoted in FIGS. 14A and 14B.

(1) Initially, the server 301*a* transmits a communication packet (such as an HTTP Reply message) that includes a malicious code and is addressed to the client terminal 101*a*.
(2) After the source IP address of the packet in the above described (1) is translated by the SLB 201 into the virtual address of the virtual server 300, the packet passes through the RIP detecting device 303 and is received by the IPS 202.
(3) Here, the IPS 202 detects that the received communication packet is an attack packet. Then, the IPS 202 destroys this attack packet without transmitting it to the external network 100. On the other hand, the IPS 202 executes processes such as a process for assigning an attack detection ID, a process for identifying the attack type of this attack packet, a process for extracting the destination IP address (namely, the IP address of the attack destination) of the attack packet, and a process for transmitting the communication packet including the attack notification A to the administrator terminal 203.

(4) Next, the IPS 202 creates an RST packet including an RIP detection request as a datagram. Then, in the IP header of the RST packet, the IPS 202 sets the IP address of the client terminal 101*a*, which is the attack destination, as a source IP address, and the virtual address of the virtual server 300 as a destination IP address respectively, and transmits the RST packet.

(5) The communication packet, which includes the attack notification A and is transmitted from the IPS 202 in the above described (3), is received by the administrator terminal 203. The attack detection ID stored in the attack notification A is that assigned in the above described (3). The IPS 202 transmits the communication packet including this attack notification A after transmitting the RST packet including the RIP detection request in the above described (4). The transmission timing of this communication packet is independent from that of the communication packet in (6) to be described below.

(6) After the destination IP address of the RST packet including the RIP detection request in the above described (4) is translated into the source IP address (namely, the real address of the server 301*a*, which is the source of the attack packet) in the above described (1), with the address reverse translation made by the SLB 201, it is received by the RIP detecting device 303.

(7) The RIP detecting device 303 executes the RIP detection process shown in FIG. 11 for the RST packet including the RIP detection request, in which the source of the attack packet is indicated as the destination IP address, and executes processes such as a process for analyzing the RIP detection request, a process for extracting the destination IP address of the received RST packet, a process for deleting the RIP detection request from the received RST packet, a process for transferring the RST packet from which the RIP detection request is deleted, and a process for transmitting the communication packet including the attack notification B to the administrator terminal 203.

(8) In the RST packet which is indicated in the above described (7) and from which the RIP detection request is deleted, the real address of the server 301*a*, which is the source of the attack packet, is indicated as the destination IP address. Therefore, this packet is received by the server 301*a*. Then, the server 301*a* forcibly disconnects the connection between the server 301*a* itself and the client terminal 101*a*. As a result, the client terminal 101*a* is protected from an attack made from the server 301*a*.

(9) In the meantime, the communication packet that is transmitted from the RIP detecting device 303 in the above described (7) and includes the attack notification B is received by the administrator terminal 203. The attack detection ID stored in the attack notification B is that assigned in the above described (3), and extracted from the RST packet including the RIP detection request based on the analysis of the RIP detection request made in the above described (7).

(10) Upon receipt of the communication packet that is indicated in the above described (5) and includes the attack notification A, and the communication packet that is indicated in the above described (9) and includes the attack notification B, the administrator terminal 203 makes a correspondence between these packets by using as keys the attack detection IDs indicated in these packets. Then, the administrator terminal 203 outputs the attack destination IP address (namely, the IP address of the client terminal 101*a*), the attack source IP address (namely, the IP address of the server 301*a*), and the attack type, which are indicated in the attack notifications A and B between which the correspondence is made, for example, by displaying them on a display device, and notifies the administrator 204.

Details of the processes executed by the IPS 202 in the above described (3) to (5) are described next with reference to FIG. 15. FIG. 15 depicts portions, which are used when the processes in the above described (3) to (5) are executed, with thick lines in the block diagram showing the functional configuration of the IPS 202 shown in FIG. 12.

Initially, the first communicating unit 211 receives the packet in the above described (2), the source IP address of which is translated by the SLB 201 into the virtual address of the virtual server 300. Here, the attack detection functioning unit 212 detects that this received packet is an attack packet. Then, the attack detection functioning unit 212 identifies the attack type of the attack packet, transmits its result to the attack notification A creating unit 221, and activates the second reception packet determining unit 215.

The second reception packet determining unit 215 determines that the communications interface which has received this attack packet is for the internal network 200, and activates the attack detection ID assigning unit 217 according to the determination result.

The attack detection ID assigning unit 217 generates an attack detection ID to be assigned to the attack packet, and transmits the generated ID to the RIP detection request creating unit 219 and the attack notification A creating unit 221. Then, the attack detection ID assigning unit 217 activates the RIP detection request creating unit 219 and the attack destination IP address extracting unit 220.

The RIP detection request creating unit 219 creates an RIP detection request with the IP address of the administrator terminal 203, which is obtained from the administrator terminal IP address holding unit 218, and the attack detection ID assigned by the attack detection ID assigning unit 217. Then, the RIP detection request creating unit 219 creates an RST packet including the RIP detection request, and sets, in its IP header, a source IP address to the IP address of the client terminal 101*a* (namely, the attack destination), and a destination IP address to the virtual address of the virtual server 300. Then, the RIP detection request creating unit 219 transmits the created RST packet including the RIP detection request to the first communicating unit 211, which is then made to transmit the packet to the internal network 200 (the above described (4)).

In the meantime, the attack destination IP address extracting unit 220 extracts the destination IP address of the detected attack packet as the IP address of the attack destination. Then, the attack destination IP address extracting unit 220 transmits the extracted IP address to the attack notification A creating unit 221.

The attack notification A creating unit 221 creates an attack notification A with the attack detection ID assigned by the attack detection ID assigning unit 217, the attack type of the attack packet, which is identified by the attack detection functioning unit 212, and the attack destination IP address extracted by the attack destination IP address extracting unit 220. Then, the attack notification A creating unit 221 creates an IP packet including the attack notification A as a datagram. In the IP header of this IP packet, the IP address of the IPS 202 itself is set as a source IP address, and the IP address of the administrator terminal 203, which is obtained from the administrator terminal IP address holding unit 218, is set as a destination IP address. Then, the attack notification A creating unit 221 transmits the created IP packet to the first communicating unit 211, which is then made to transmit the packet to the internal network 200 (the above described (5)).

Details of the processes executed by the RIP detecting device 303 in the above described (7) to (9) are described next with reference to FIG. 16. FIG. 16 depicts portions, which are used when the processes in the above described (7) to (9) are executed, with thick lines in the block diagram showing the functional configuration of the RIP detecting device 303 shown in FIG. 13.

Initially, the second communicating unit 311 receives the packet in the above described (6) (namely, the RST packet including the RIP detection request) the destination IP address of which is translated by the SLB 201 into the real address of the server 301*a* that is the source of the attack packet. Then, the third reception packet determining unit 312 determines that this received packet is an RST packet and its size is larger than 40 octets, and transmits this packet to the RIP detection request analyzing unit 313 based on the determination result.

The RIP detection request analyzing unit 313 extracts the data of the fields of the RIP detection request included in the received packet, transmits the extracted data to the attack notification B creating unit 315 and the RIP detection request deleting unit 316, and activates the attack source IP address extracting unit 314.

The attack source IP address extracting unit 314 extracts the destination IP address of the received packet as an attack source IP address, transmits the extracted address to the attack notification B creating unit 315, and activates the RIP detection request deleting unit 316.

The attack notification B creating unit 315 creates an attack notification B with the attack detection ID extracted by the RIP detection request analyzing unit 313, and the attack source IP address extracted by the attack source IP address extracting unit 314. Then, the attack notification B creating unit 315 creates an IP packet including the attack notification B as a datagram, and sets the IP address of the RIP detecting device 303 itself as a source IP address, and the IP address of the administrator terminal 203, which is extracted by the RIP detection request analyzing unit 313, as a destination IP address in the IP header. Then, the attack notification B creating unit 315 transmits the created IP packet to the second communicating unit 311, which is then made to transmit the packet to the internal network 200 (the above described (9)).

In the meantime, the RIP detection request deleting unit 316 deletes the RIP detection request included in the received packet as the datagram. Then, the RIP detection request deleting unit 316 transmits the generated RST packet to the second communicating unit 311, which is then made to transmit the RST packet to the server 301*a* at the attack source, which has transmitted the attack packet (the above described (8)).

Figure 17A:
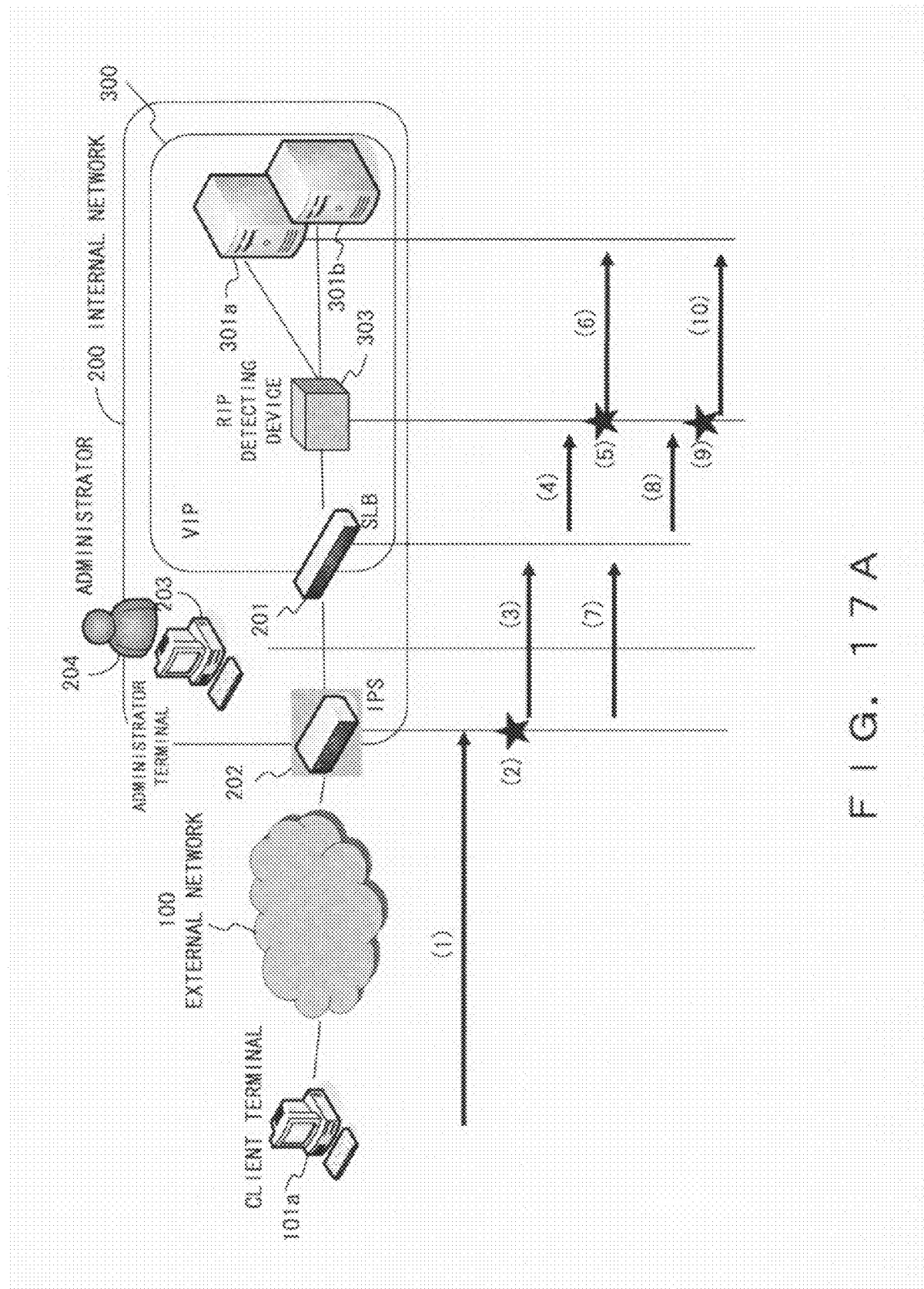
FIG. 17A is a schematic showing a state where various types of communication packets are exchanged when a client terminal transmits an RST packet addressed to a virtual server.

FIGS. 17A and 17B are described next. FIG. 17A shows a state where various types of communication packets are exchanged when the client terminal 101*a* transmits an RST packet addressed to the virtual server 300, whereas FIG. 17B shows the listing of the communication packets exchanged in the case of FIG. 17A. In FIG. 17A, only the client terminal 101*a* is depicted as a terminal existing in the external network 100 for the sake of simplification.

Here, assume that the IP addresses of the devices existing in the communications networks shown in FIG. 17A are defined to be identical to those in FIG. 14A.

The state where various types of communication packets are exchanged is described according to item numbers denoted in FIGS. 17A and 17B.

(1) Initially, the client terminal 101*a* transmits an RST packet including normal (unmalicious) data as a datagram to the virtual server 300. This RST packet is received by the IPS 202.

(2) Upon detecting that the RST packet is received by the interface for the external network 100, the IPS 202 separates the RST packet into a TCP packet including only a datagram, and an RST packet the datagram of which is empty, and transmits the separated packets.

(3) The TCP packet including only the datagram among the communication packets separated in the above described (2) is first received by the SLB 201.

(4) After the address translation process by the SLB 201 is executed for the TCP packet in the above described (3), it is received by the RIP detecting device 303. Here, assume that the destination IP address of this TCP packet is translated into the real address of the server 301*b* with the address translation made by the SLB 201.

(5) The RIP detecting device 303 executes the RIP detection process shown in FIG. 11 for the TCP packet in the above described (4), but transmits the TCP packet unchanged to the server 301*b* without making any changes as a result of the process.

(6) Upon receipt of the TCP packet in the above described (4), the server 301*b* reads the datagram of the TCP packet, and executes a predetermined process.

(7) In the meantime, the RST packet the datagram of which is empty among the communication packets separated in the above described (2) is received by the SLB 201 subsequently to the TCP packet including only the datagram.

(8) After the destination IP address of the RST packet in the above described (7) is translated into the real address of the server 301*b* with the address translation process executed by the SLB 201, it is received by the RIP detecting device 303.

(9) The RIP detecting device 303 executes the RIP detection process shown in FIG. 11 for the RST packet in the above described (8), but transfers the RST packet unchanged to the server 301*b* without making any changes as a result of the process.

(10) Upon receipt of the RST packet in the above described (9), the server 301*b* forcibly disconnects the TCP connection between the server 301*b* itself and the client terminal 101.

In this way, in the communications network shown in FIG. 5, the RST packet, which is transmitted by the client terminal 101*a* and includes normal (unmalicious) data as a datagram, is separated as stated earlier, and the server 301*b* properly executes a process according to contents instructed by the RST packet.

Details of the processes executed by the IPS 202 in the above described (2), (3), and (7) are described next with reference to FIG. 18. FIG. 18 depicts portions, which are used when the processes in the above described (2), (3), and (7) are executed, with thick lines in the block diagram showing the functional configuration of the IPS 202 shown in FIG. 12.

Initially, the first communicating unit 211 receives the packet in the above described (2), the source IP address of which is translated by the SLB 201 into the virtual address of the virtual server 300. Here, the attack detection functioning unit 212 determines that this received packet is not an attack packet. Then, the attack detection functioning unit 212 transmits the determination result to the first reception packet determining unit 213.

Here, the first reception packet determining unit 213 determines that the received packet is an RST packet, which is received from the communications interface on the side of the external network 100 and includes a datagram, and transmits the received packet to the packet separating unit 214.

The packet separating unit 214 separates the RST packet received from the first reception packet determining unit 213 into a data packet which includes only the datagram of the RST packet as a datagram of the data packet itself and the source and the destination of which are made identical to the RST packet, and the RST packet from which only the datagram is deleted. Then, the packet separating unit 214 transmits the obtained data packet and RST packet to the first communicating unit 211, which is then made to transmit both of these packets to the internal network 200 in this order (the above described (3) and (7)).

Figure 19:
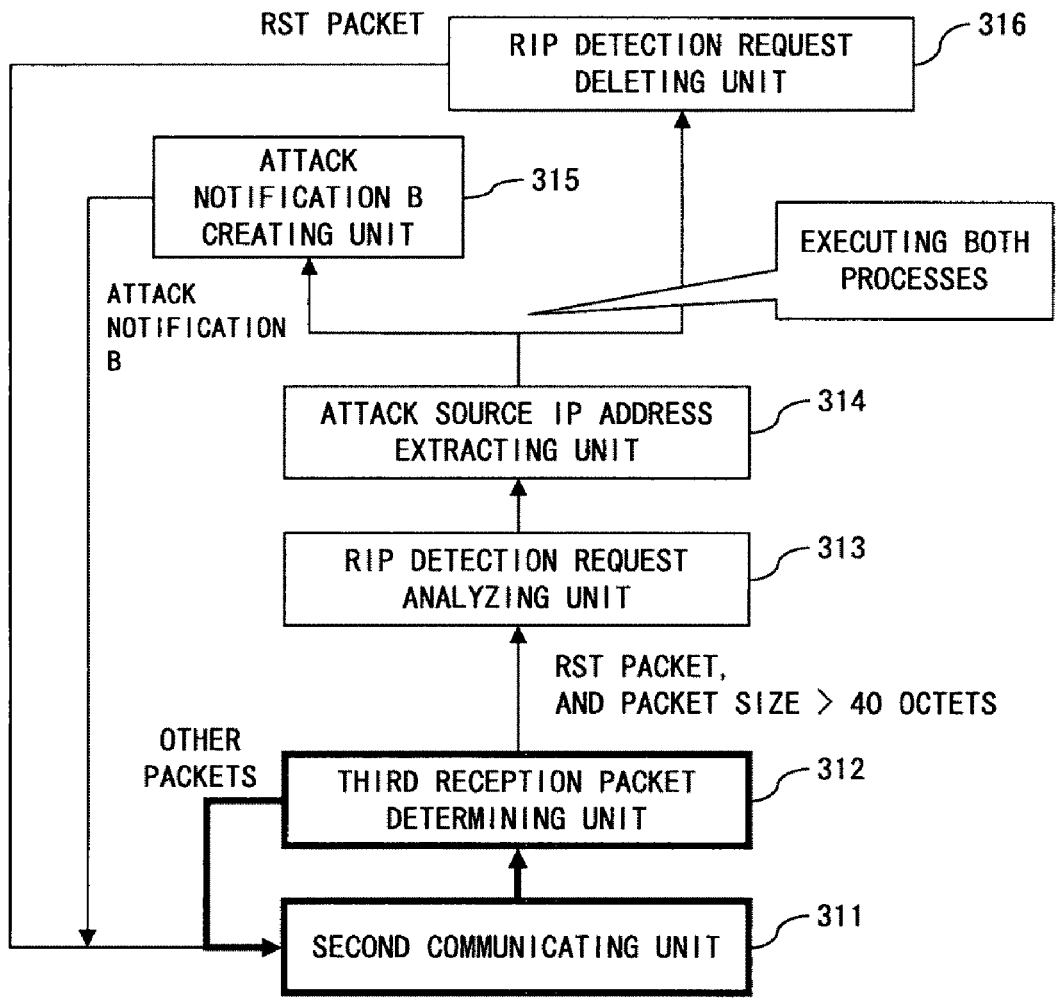
FIG. 19 is a schematic explaining the details of processes executed by the RIP detecting device in the case of FIG. 17A.

Details of the processes executed by the RIP detecting device 303 in the above described (5) and (6) are described next with reference to FIG. 19. FIG. 19 depicts portions, which are used when the processes in the above described (5) and (6) are executed, with thick lines in the block diagram showing the functional configuration of the RIP detecting device 303 shown in FIG. 13.

Initially, the second communicating unit 311 receives the TCP packet (TCP packet including only the datagram), the destination IP address of which is translated into the real address of the server 301b with the address translation made by the SLB 201. Then, the third reception packet determining unit 312 determines that this received packet is not an RST packet, transmits the received packet, based on the determination result, to the second communicating unit 311, which is then made to transmit the packet to the server 301b unchanged (the above described (6)).

Details of the processes executed by the RIP detecting device 303 in the above described (9) and (10) are described next. If portions, which are used when the processes in the above described (9) and (10) are executed in the block diagram showing the functional configuration of the RIP detecting device 303 shown in FIG. 13, are depicted with thick lines, this drawing becomes the same as FIG. 19.

Initially, the second communicating unit 311 receives the RST packet (RST packet the datagram of which is empty), the destination IP address of which is translated into the real address of the server 301b with the address translation made by the SLB 201. Then, the third reception packet determining unit 312 determines that the size of this received packet is equal to or smaller than 40 octets, and transmits the received packet, based on the determination result, to the second communicating unit 311, which is then made to transmit the packet to the server 301b (the above described (6)).

As described above, the attack detecting system provided in the communications network shown in FIG. 5 can inexpensively provide the function to detect an address before being translated from the internal network 200 after the address is translated by the SLB 201.

In the above described preferred embodiment, the functional configuration of the IPS 202 shown in FIG. 12 and that of the RIP detecting device 303 shown in FIG. 13 can be also implemented by shared hardware. Namely, the functions provided by these configurations can be implemented, for example, with a computer comprising a nonvolatile memory such as a ROM (Read Only Memory), etc., a volatile memory such as a RAM (Random Access Memory), etc., and an MPU (Micro Processing Unit). Namely, a program for implementing the functions of the constituent elements is created beforehand and stored in the nonvolatile memory, and the MPU reads the program and executes the program while using the volatile memory as a working storage area, whereby the functional configurations of the IPS 202 and the RIP detecting device 303 can be also implemented.

Up to this point, the preferred embodiment according to the present invention has been described. The present invention is not limited to the above described preferred embodiment, and various improvements and modifications can be made within a scope not deviating from the gist of the present invention.

What is claimed is:

1. An attack detecting system for detecting an attack to a terminal device, which exists in a communications network external to an organization, from any of a plurality of server devices, which exist in a communications network within the organization and to which a shared virtual address is assigned by an address translating device in addition to a real address unique to each of the plurality of server devices, comprising:
   a packet examining unit which examines a communication packet exchanged between the communications network within the organization and the communications network external to the organization, and which detects a particular packet that satisfies a particular condition;
   a source communications network determining unit which determines whether the particular packet was transmitted from the communications network within the organization or from the communications network external to the organization when the packet examining unit detects the particular packet;
   a detection request message creating unit which creates a detection request message which includes a request to detect a source of the particular packet and a destination of which is set to the virtual address, and which transmits the created message to the address translating device, when the source communications network determining unit determines that the particular packet was transmitted from the communications network within the organization; and
   a destination extracting unit which extracts a real address indicated as the destination in the detection request message, upon receipt of the detection request message the destination of which is rewritten by the address translating device from the virtual address to a real address of the server device, which is the source of the particular packet.

2. The attack detecting system according to claim 1, further comprising
   a forcible disconnection message transmitting unit which transmits a message to forcibly disconnect a connection used to transmit the particular packet to the server device identified with the real address extracted by said destination extracting unit.

3. The attack detecting system according to claim 1, wherein
   said detection request message creating unit creates, as the detection request message, an RST packet of the TCP protocol, which is intended to forcibly disconnect a connection used to transmit the particular packet and includes, as a datagram, information indicating a request to detect the source of the particular packet.

4. The attack detecting system according to claim 3, further comprising
   a forcible disconnection message transmitting unit which transmits the RST packet, from which only the datagram is deleted, to the server device identified with the real address, when said destination extracting unit receives the RST packet, which is the detection request message and the destination of which is rewritten by the address translating device from the virtual address to the real address of the server device, which is the source of the particular packet.

5. The attack detecting system according to claim 4, further comprising
   an RST packet separating unit which separates an RST packet of the TCP protocol, which is transmitted from a terminal device existing in the communications network external to the organization, into a TCP packet, which includes only the datagram included in the RST packet as a datagram of the TCP packet itself and a source and a destination of which are made identical to the RST packet, and the RST packet from which only the datagram is deleted, wherein the RST packet separating unit transmits the separated packets to the address translating device, when said packet examining unit detects the RST packet.

6. The attack detecting system according to claim 5, wherein said destination extracting unit comprises a detection request message determining unit which determines, based on a size of an RST packet, whether or not the RST packet received from the address translating device is the detection request message.

7. The attack detecting system according to claim 1, wherein:

said packet examining unit comprises a particular packet information transmitting unit which transmits particular packet information, which is information about the particular packet detected by said packet examining unit, to a predetermined administrator terminal device; and said destination extracting unit comprises a real address information transmitting unit which transmits information about the real address extracted by said destination extracting unit to the administrator terminal device.

8. The attack detecting system according to claim 7, wherein:

the detection request message includes identification information about the particular packet information; and said real address information transmitting unit adds, to the information about the real address, the identification information included in the detection request message received from the address translating device, and transmits the information.

9. The attack detecting system according to claim 7, wherein:

the detection request message includes address information for identifying the administrator terminal device; and said real address information transmitting unit transmits the information about the real address by using, as a destination, the address information included in the detection request message received from the address translating device.

10. An attack detecting method for detecting an attack to a terminal device, which exists in a communications network external to an organization, from any of a plurality of server devices, which exist in a communications network within the organization and to which a shared virtual address is assigned by an address translating device in addition to a real address unique to each of the plurality of server devices, comprising:

examining a communication packet exchanged between the communications network within the organization and the communications network external to the organization, and detecting a particular packet that satisfies a particular condition;

determining whether the particular packet was transmitted from the communications network within the organization or from the communications network external to the organization when the particular packet is detected;

creating a detection request message, which includes a request to detect a source of the particular packet and a destination of which is set to the virtual address, and transmitting the created message to the address translating device, when it is determined that the particular packet was transmitted from the communications network within the organization; and extracting a real address indicated as the destination in the detection request message, upon receipt of the detection request message the destination of which is rewritten by the address translating device from the virtual address to the real address of the server device, which is the source of the particular packet.

11. The attack detecting method according to claim 10, further comprising transmitting a message to forcibly disconnect a connection used to transmit the particular packet to the server device identified with the real address extracted by said extracting the real address.

12. The attack detecting method according to claim 10, further comprising creating, as the detection request message, an RST packet of the TCP protocol, which is intended to forcibly disconnect a connection used to transmit the particular packet and includes, as a datagram, information indicating a request to detect the source of the particular packet, when the detection request message to be transmitted to the address translating device is created.

13. The attack detecting method according to claim 12, wherein if the RST packet which is the detection request message and a destination of which is rewritten by the address translating device from the virtual address to the real address of the server device, which is the source of the particular packet, is received when the message to forcibly disconnect the connection used to transmit the particular packet is transmitted, the RST packet from which only the datagram is deleted is transmitted to the server device identified with the real address.

14. The attack detecting method according to claim 13, further comprising separating an RST packet of the TCP protocol, which is transmitted from a terminal device existing in the communications network external to the organization, into a TCP packet, which includes only the datagram included in the RST packet as a datagram of the TCP packet itself and a source and a destination of which are made identical to the RST packet, and the RST packet from which only the datagram is deleted, and transmitting the separated packets to the address translating device, upon detection of the RST packet when the particular packet is detected.

15. The attack detecting method according to claim 14, further comprising:

determining, based on a size of an RST packet, whether or not the RST packet received from the address translating device is the detection request message, prior to said extracting the real address.

16. The attack detecting method according to claim 10, further comprising:

transmitting particular packet information, which is information about the particular packet, to a predetermined administrator terminal device, when the particular packet is detected by said examining; and transmitting information about the extracted real address to the administrator terminal device, when the real address is extracted.

17. The attack detecting method according to claim 16, wherein:

the detection request message includes identification information for the particular packet information; and the identification information included in the detection request message received from the address translating device is added to the information about the real address, and the information is transmitted, when the information about the real address is transmitted.

18. The attack detecting method according to claim 16, wherein:

the detection request message includes address information for identifying the administrator terminal device; and the information about the real address is transmitted by using, as a destination, the address information included in the detection request message received from the address translating device, when the information about the real address is transmitted.

* * * * *